(12) United States Patent
Takagi

(10) Patent No.: US 8,397,263 B2
(45) Date of Patent: Mar. 12, 2013

(54) INFORMATION PROCESSING APPARATUS, INFORMATION PROCESSING METHOD AND INFORMATION PROCESSING PROGRAM

(75) Inventor: Tsuyoshi Takagi, Kanagawa (JP)

(73) Assignee: Sony Corporation (JP)

( * ) Notice: Subject to any disclaimer, the term of this patent is extended or adjusted under 35 U.S.C. 154(b) by 809 days.

(21) Appl. No.: 12/074,189

(22) Filed: Feb. 29, 2008

(65) Prior Publication Data

US 2008/0216123 A1 Sep. 4, 2008

(30) Foreign Application Priority Data

Mar. 2, 2007 (JP) ................ P2007-052627

(51) Int. Cl.
- G06F 3/00 (2006.01)
- H04N 7/16 (2011.01)
- H04N 7/00 (2011.01)
- G06F 7/00 (2006.01)

(52) U.S. Cl. ............ 725/58; 725/57; 725/137; 348/465; 348/468; 707/769

(58) Field of Classification Search .................... 725/53, 725/55, 57–58, 137; 348/465, 468; 707/1, 707/769
See application file for complete search history.

(56) References Cited

U.S. PATENT DOCUMENTS

| | | | | |
|---|---|---|---|---|
| 5,664,227 A | * | 9/1997 | Mauldin et al. | 715/203 |
| 6,061,056 A | * | 5/2000 | Menard et al. | 715/704 |
| 6,880,171 B1 | * | 4/2005 | Ahmad et al. | 725/134 |
| 2003/0004716 A1 | * | 1/2003 | Haigh et al. | 704/238 |
| 2005/0076037 A1 | * | 4/2005 | Shen | 707/100 |
| 2007/0073745 A1 | * | 3/2007 | Scott et al. | 707/100 |
| 2007/0261070 A1 | * | 11/2007 | Brown et al. | 725/9 |
| 2008/0183698 A1 | * | 7/2008 | Messer et al. | 707/5 |
| 2010/0100908 A1 | * | 4/2010 | Zhang et al. | 725/51 |

FOREIGN PATENT DOCUMENTS

| | | |
|---|---|---|
| EP | 1 100 265 | 5/2001 |
| JP | 10285528 A | 10/1998 |
| JP | 2001-086442 | 3/2001 |
| JP | 2002118793 A | 4/2002 |
| JP | 2006343941 A | 12/2006 |

OTHER PUBLICATIONS

Office Action from Japanese Application No. 2007-052627, dated Apr. 26, 2011.

* cited by examiner

Primary Examiner — Chris Parry
Assistant Examiner — Gigi L Dubasky
(74) Attorney, Agent, or Firm — Lerner, David, Littenberg, Krumholz & Mentlik, LLP

(57) ABSTRACT

In an information processing apparatus, a text information receiving unit receives text information, and a received text morphological analysis unit performs morphological analysis on the text information. An extraction unit extracts text information of a subtitle included in a program. A subtitle text morphological analysis unit performs morphological analysis on the text information of the subtitle. A similarity calculation unit calculates the similarity between a keyword included in a result of the received text morphological analysis performed by the received text morphological analysis unit and a keyword included in a result of the subtitle text morphological analysis performed by the subtitle text morphological analysis unit. A comparison unit compares the similarity with a predetermined threshold value. A recording unit records the program at a time at which the comparison unit determines that the subtitle text of the program currently includes a keyword having similarity higher than the predetermined threshold value.

11 Claims, 17 Drawing Sheets

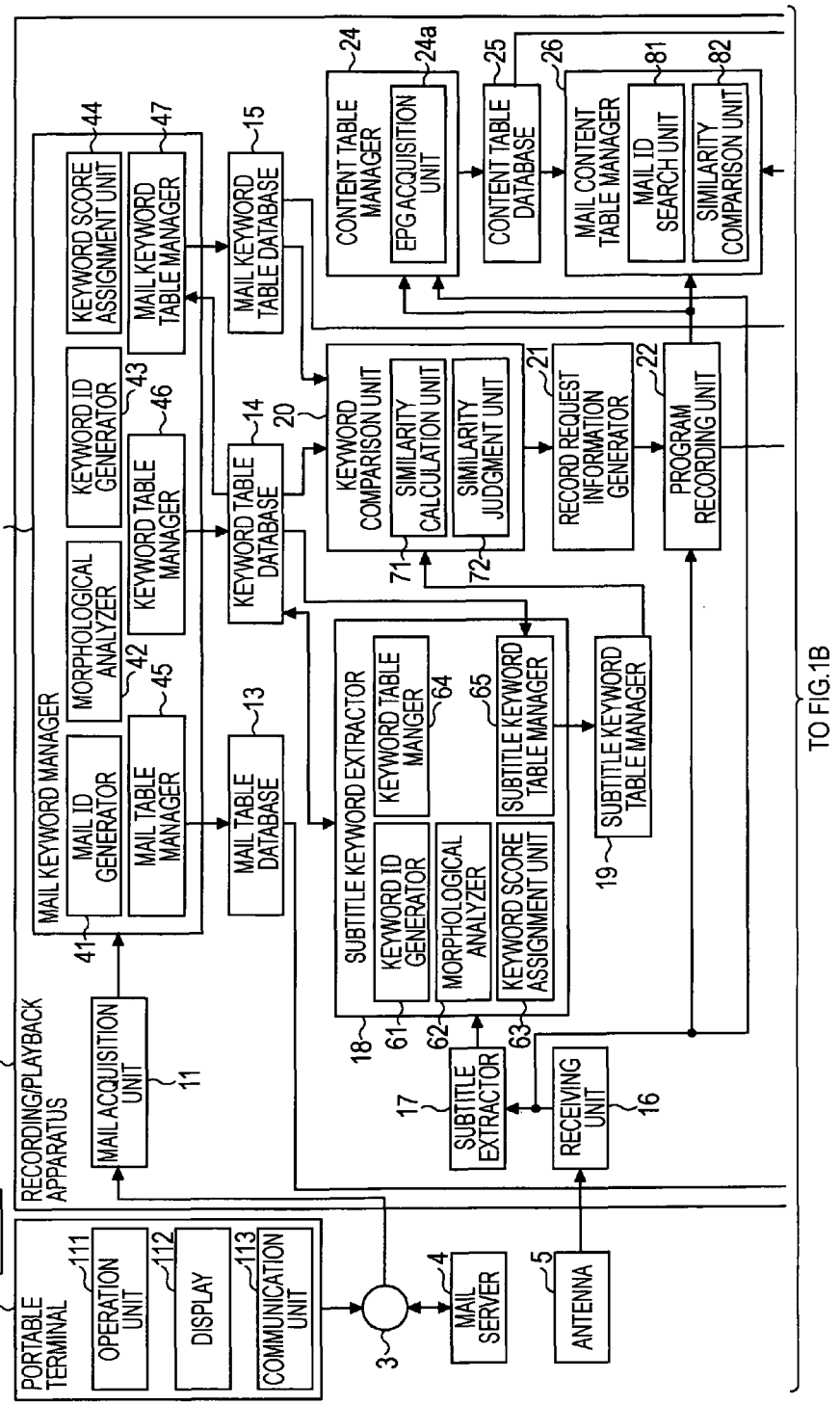

FROM FIG.1A

FIG. 5

| MAIL ID | MAIL TITLE | MAIL BODY |
|---|---|---|

FIG. 6

| KEYWORD ID | KEYWORD |
|---|---|

FIG. 7

| MAIL ID | KEYWORD ID | SCORE |
|---|---|---|

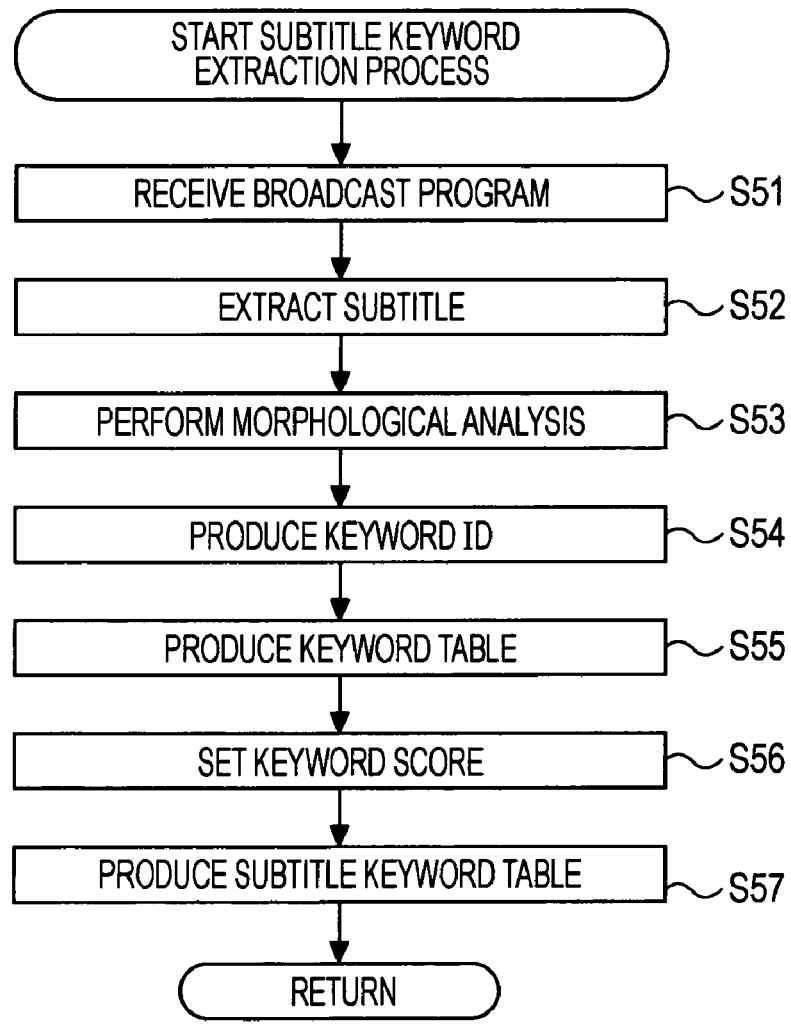

FIG. 11

| MAIL KEYWORD | a : KEYWORD O | b : KEYWORD P | |
|---|---|---|---|
| SUBTITLE KEYWORD | c : KEYWORD O | d : KEYWORD Q | e : KEYWORD R | f : KEYWORD S |

FIG. 12

| MAIL ID | CHANNEL | SIMILARITY |
|---|---|---|

INFORMATION PROCESSING APPARATUS, INFORMATION PROCESSING METHOD AND INFORMATION PROCESSING PROGRAM

CROSS-REFERENCE TO RELATED APPLICATIONS

The present application claims priority from Japanese Patent Application No. JP 2007-052627 filed in the Japanese Patent Office on Mar. 2, 2007, the entire content of which is incorporated herein by reference.

BACKGROUND OF THE INVENTION

1. Field of the Invention

The present invention relates to an information processing apparatus, an information processing method, and information indicating an information processing program, and more particularly, to an information processing apparatus, an information processing method, and an information processing program, capable of recording and/or playing back a particular scene in a program (content).

2. Description of the Related Art

Various techniques have been proposed to easily record a program in a timer-controlled mode.

For example, in an information processing apparatus adapted to manage personal schedules, each box for inputting a personal schedule at each hour includes a subbox for inputting a time at which to start recording a particular program and a subbox for inputting information specifying a station which will broadcast the program to be recorded, whereby the program broadcast by the specified station is recorded, starting at the specified start time (see, for example, Japanese Examined Patent Application Publication No. 3420213).

In another technique, a user accesses a record service center via a telephone line. If the user is authenticated as an authorized user, the user is allowed to set an automatic recording operation such that a specified broadcast program is transmitted at a specified start time together with a control signal that causes a particular pre-registered recording apparatus to start recording the broadcast program whereby the user is allowed to record a desired program on the recording apparatus (see, for example, Japanese Examined Patent Application Publication No. 3611193).

SUMMARY OF THE INVENTION

However, in the techniques described above, it is difficult to set timer-controlled recording so as to selectively record a particular scene in a program, although it is possible to record the whole program. Therefore, after a program including a particular scene is recorded in the timer-controlled mode, a user has to view the whole program to find the particular scene. In a case where the scene of the topic is located near the end of the program, it takes a time almost equal to the total time of the program to find the scene.

In view of the above, it is desirable to provide a technique to record and/or play back a particular scene in a program.

SUMMARY OF THE INVENTION

According to an embodiment of the present invention, there is provided an information processing apparatus including text information receiving portion configured to receive text information, received text morphological analysis portion configured to perform morphological analysis on the text information, extraction portion configured to extract text information of a subtitle included in a program, subtitle text morphological analysis portion configured to perform morphological analysis on the text information of the subtitle, similarity calculation portion configured to calculate the similarity between a keyword included in a result of the received text morphological analysis performed by the received text morphological analysis portion and a keyword included in a result of the subtitle text morphological analysis performed by the subtitle text morphological analysis portion, comparison portion configured to compare the similarity with a predetermined threshold value, and recording portion configured to record the program at a time at which the comparison portion determines, as a result of the comparison, that the subtitle text of the program currently includes a keyword having similarity higher than the predetermined threshold value.

The information processing apparatus may further include received text morphological analysis weighting portion configured to assign a weight to each keyword included in the result of the received text morphological analysis, depending on the number of occurrences of each keyword and depending on the part of speech of each keyword, subtitle text morphological analysis weighting portion configured to assign a weight to each keyword included in the result of the subtitle text morphological analysis, depending on the number of occurrences of each keyword and depending on the part of speech of each keyword, wherein the similarity calculation portion may calculate the similarity between the keyword included in the result of the received text morphological analysis and the keyword included in the result of the subtitle text morphological analysis, by using the weight assigned to each keyword included in the result of the received text morphological analysis and the weight assigned to each keyword included in the result of the subtitle text morphological analysis.

The text information receiving portion may receive the text information via an electronic mail, and the information processing apparatus may further include registration portion configured to register, in a table, the program recorded by the recording portion and information indicating the similarity in association with the electronic mail, when the recording portion records the program at a time at which the comparison portion determines, as a result of the comparison, that the subtitle text of the program currently includes a keyword having similarity higher than the predetermined threshold value.

The information processing apparatus may further include display portion configured to display information associated with one or more programs registered in the table, in the order of decreasing similarity.

The information processing apparatus may further include selection portion configured to select information associated with a program registered in the table from one or more pieces of information displayed by the display portion, and playback portion configured to play back the program selected by the selection portion.

According to an embodiment of the present invention, there is provided an information processing method including the steps of receiving text information, performing morphological analysis on the text information, extracting text information of a subtitle included in a program, performing morphological analysis on the text information of the subtitle, calculating the similarity between a keyword included in a result of the received text morphological analysis performed in the received text morphological analysis step and a keyword included in a result of the subtitle text morphological analysis performed in the subtitle text morphological analysis step, comparing the similarity with a predetermined threshold value, and recording the program at a time at which the comparison step determines, as a result of the comparison, that the subtitle text of the program currently includes a keyword having similarity higher than the predetermined threshold value.

According to an embodiment of the present invention, there is provided a computer program executable by a computer to perform a process including the steps of receiving text information, performing morphological analysis on the text information, extracting text information of a subtitle included in a program, performing morphological analysis on the text information of the subtitle, calculating the similarity between a keyword included in a result of the received text morphological analysis performed in the received text morphological analysis step and a keyword included in a result of the subtitle text morphological analysis performed in the subtitle text morphological analysis step, comparing the similarity with a predetermined threshold value, and recording the program at a time at which the comparison step determines, as a result of the comparison, that the subtitle text of the program currently includes a keyword having similarity higher than the predetermined threshold value.

In the information processing apparatus, the information processing method, and the computer program, text information is received, morphological analysis is performed on the text information, a broadcast program is received, text information of a subtitle included in the program is extracted, morphological analysis is performed on the text information of the subtitle, the similarity is calculated between a keyword included in the result of the received text morphological analysis performed on the received text information and a keyword included in the result of the subtitle text morphological analysis, the calculated similarity is compared with the predetermined threshold value, and the broadcast program is recorded at a time at which the result of the comparison indicates that the subtitle text of the program currently includes a keyword having similarity higher than the predetermined threshold value.

The computer program may be stored in a storage medium.

Note that the information processing apparatus may be in the form of a standalone apparatus or may be a block.

As described above, the present invention provides the great advantage that a particular scene in a program can be recorded and played back.

BRIEF DESCRIPTION OF THE DRAWINGS

FIG. 5 is a diagram illustrating an example of a mail table;

FIG. 6 is a diagram illustrating an example of a keyword table;

FIG. 7 is a diagram illustrating an example of a mail keyword table;

FIG. 8 is a flow chart associated with a subtitle keyword extraction process;

FIG. 9 is a diagram illustrating an example of a subtitle keyword table;

FIG. 11 is a diagram provided for an explanation of a keyword comparison process;

FIG. 12 is a diagram illustrating an example of record request information;

DESCRIPTION OF THE PREFERRED EMBODIMENTS

Figure 1B:
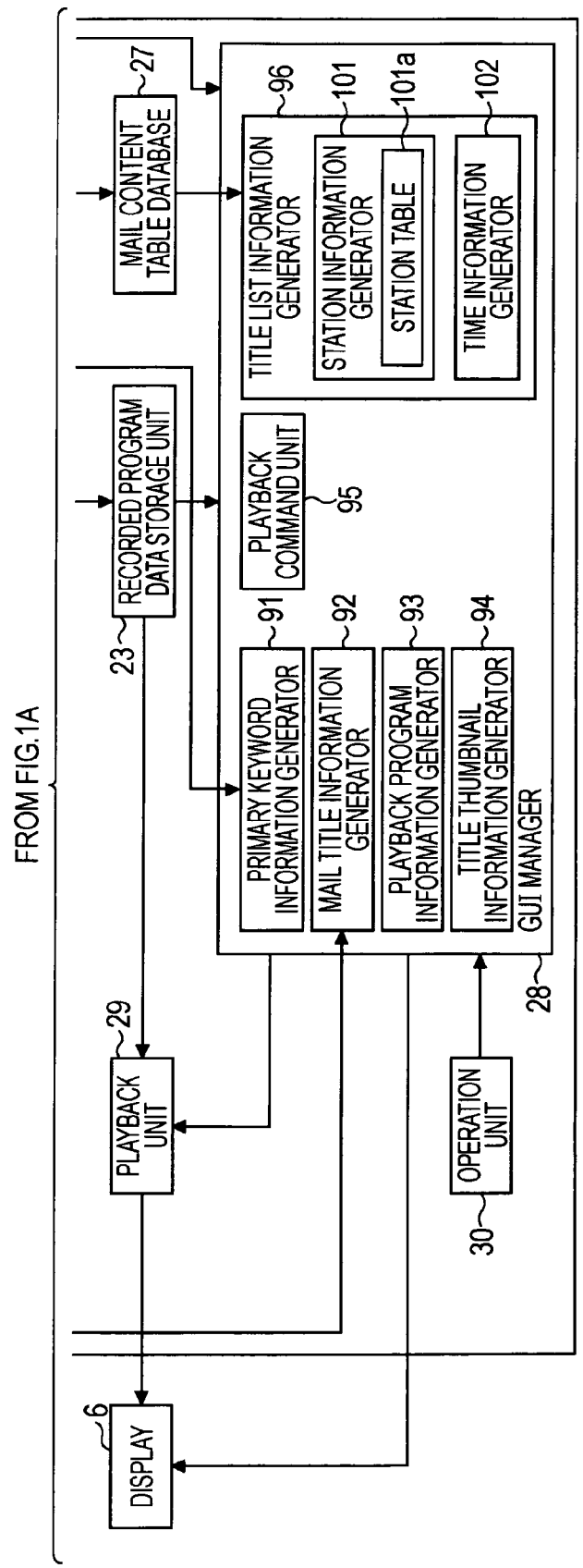
FIG. 1 is a block diagram illustrating an example of a configuration of a recording/playback apparatus according to an embodiment of the present invention.

Before describing embodiments of the present invention, the correspondence between the features of the invention and the specific elements disclosed in embodiments of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the invention. Conversely, even if an element is described herein as relating to a certain feature of the invention, that does not necessarily mean that the element does not relate to other features of the invention. Also note that it should be understood that some examples described in the embodiments can correspond to no claims. In other words, there can be a claim that correspond to an example described in the embodiments but that is not included in the current claims, that is, there can be a future claim presented by portion of division or amendment of application.

According to an embodiment of the present invention, there is provided an information processing apparatus including text information receiving portion (for example, a mail acquisition unit 11 shown in FIG. 1) for receiving text information, received text morphological analysis portion (for example, a morphological analyzer 42 shown in FIG. 1) for performing morphological analysis on the text information, extraction portion (for example, a subtitle extractor 17 shown in FIG. 1) for extracting text information of a subtitle included in a program, subtitle text morphological analysis portion (for example, a morphological analyzer 62 shown in FIG. 1) for performing morphological analysis on the text information of the subtitle, similarity calculation portion (for example, a similarity calculation unit 71 shown in FIG. 1) for calculating the similarity between a keyword included in a result of the received text morphological analysis performed by the received text morphological analysis portion and a keyword included in a result of the subtitle text morphological analysis performed by the subtitle text morphological analysis portion, comparison portion (for example, a similarity judgment unit 72 shown in FIG. 1) for comparing the similarity with a predetermined threshold value, and recording portion (for example, a program recording unit 22 shown in FIG. 1) for recording the program at a time at which the comparison portion determines, as a result of the comparison, that the subtitle text of the program currently includes a keyword having similarity higher than the predetermined threshold value.

The information processing apparatus may further include received text morphological analysis weighting portion (for example, a keyword score assigning unit 44 shown in FIG. 1) for assigning a weight to each keyword included in the result of the received text morphological analysis, depending on the number of occurrences of each keyword and depending on the part of speech of each keyword, subtitle text morphological analysis weighting portion (for example, a mail acquisition unit 63 shown in FIG. 1) for assigning a weight to each keyword included in the result of the subtitle text morphological analysis, depending on the number of occurrences of each keyword and depending on the part of speech of each keyword, wherein the similarity calculation portion (for example, a similarity calculation unit 71 shown in FIG. 1) may calculate the similarity between the keyword included in the result of the received text morphological analysis and the keyword included in the result of the subtitle text morphological analysis, by using the weight assigned to each keyword included in the result of the received text morphological analysis and the weight assigned to each keyword included in the result of the subtitle text morphological analysis.

The text information receiving portion may receive the text information via an electronic mail, and the information processing apparatus may further include registration portion (for example, a mail content table manager 26 shown in FIG. 1) for registering, in a table, the program recorded by the recording portion and information indicating the similarity in association with the electronic mail, when the recording portion (for example, a program recording unit 22 shown in FIG. 1) records the program at a time at which the comparison portion determines, as a result of the comparison, that the subtitle text of the program currently includes a keyword having similarity higher than the predetermined threshold value.

The information processing apparatus may further include display portion (for example, a title list information generator 96 shown in FIG. 1) for displaying information associated with one or more programs registered in the table, in the order of decreasing similarity.

The information processing apparatus may further include selection portion (for example, an operation unit 30 shown in FIG. 1) for selecting information associated with a program registered in the table from one or more pieces of information displayed by the display portion, and playback portion (for example, a playback unit 29 shown in FIG. 1) for playing back the program selected by the selection portion.

Figure 13:
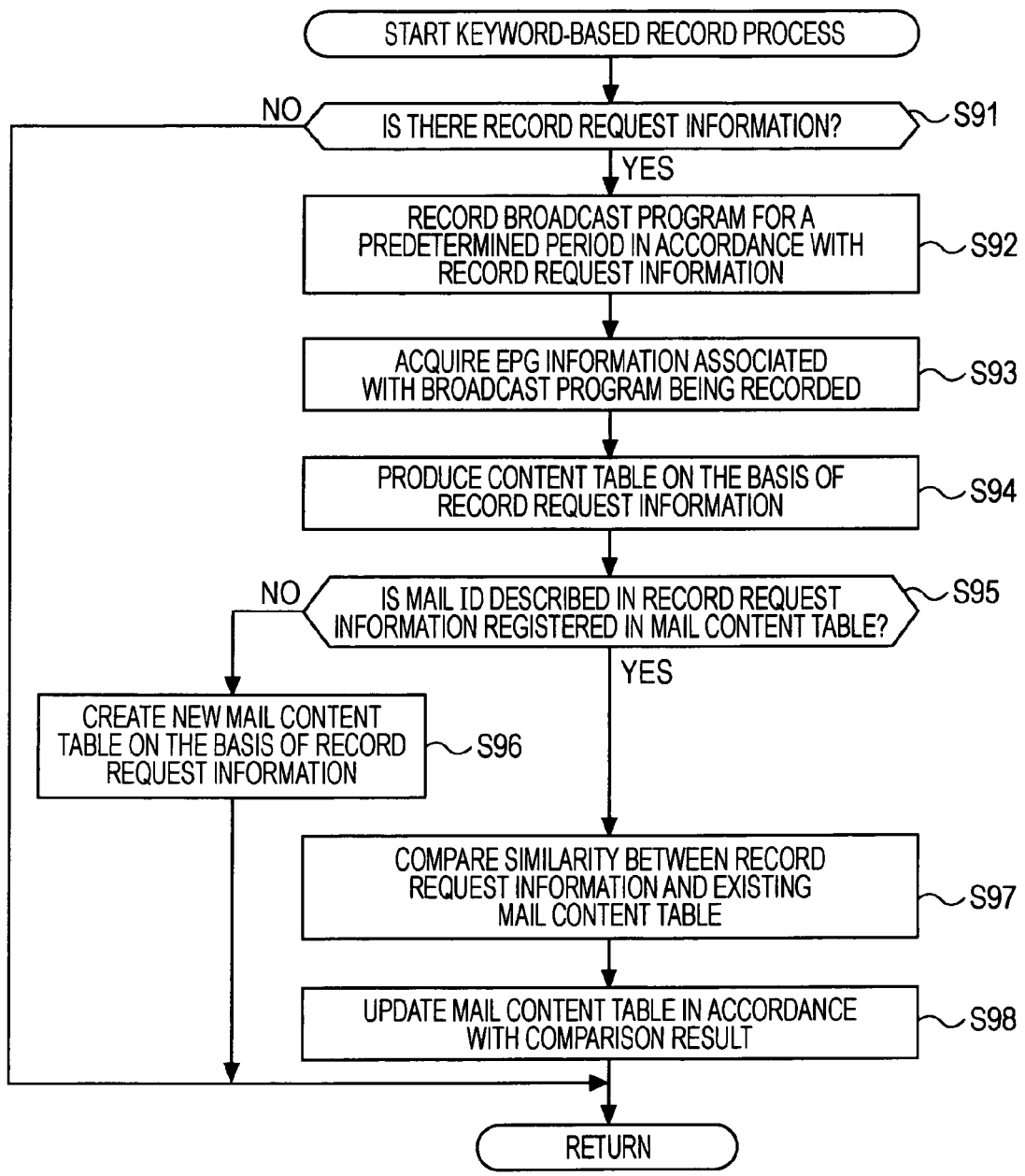
FIG. 13 is a flow chart associated with a keyword-based recording process.

According to an embodiment of the present invention, there is provided an information processing method including the steps of receiving text information (for example, in step S11 in FIG. 2), performing morphological analysis on the text information (for example, in step S34 in FIG. 4), extracting text information of a subtitle included in a program (for example, in step S52 in FIG. 8), performing morphological analysis on the text information of the subtitle (for example, in step S53 in FIG. 8), calculating the similarity between a keyword included in a result of the received text morphological analysis performed in the received text morphological analysis step and a keyword included in a result of the subtitle text morphological analysis step (for example, in step S73 in FIG. 10), comparing the similarity with a predetermined threshold value (for example, in step S74 in FIG. 10), and recording the program at a time at which the comparison step determines, as a result of the comparison, that the subtitle text of the program currently includes a keyword having similarity higher than the predetermined threshold value (for example, in step S93 in FIG. 13).

FIG. 1 illustrates a recording/playback apparatus according to an embodiment of the present invention.

The recording/playback apparatus 1 shown in FIG. 1 is configured to receive electronic mail transmitted from a portable terminal 2 such as a portable telephone device by accessing a mail server via a network 3 such as the Internet. In accordance with information described in the received electronic mail, a particular scene in a program received via an antenna 5 is recorded. The recorded scene is displayed on a display 6.

The portable terminal 2 includes an operation unit 111 having a keyboard or operation buttons, a display such as a LCD (Liquid Crystal Display), and a communication unit 113 including a network device for performing communication via the network 3 such as a public communication line or the Internet.

A mail acquisition unit 11 repeatedly accesses a mail server 4 via the network 3 at predetermined intervals to acquire electronic mail addressed to the portable terminal 2 thereby receiving the electronic mail transmitted to the mail acquisition unit 11. The acquired electronic mail is supplied to a mail keyword extraction unit 12.

The mail keyword extraction unit 12 extracts keywords from txt data of the received electronic mail and stores the extracted keywords in a mail keyword table database 15.

In the mail keyword extraction unit 12, a mail ID generator 41 produces a mail ID identifying each electronic mail supplied from the mail acquisition unit 11.

The morphological analyzer 42 performs morphological analysis on the text data of the electronic mail received by the mail acquisition unit 11 and divides the text data into morphemes (hereinafter, the morphemes will be referred to keywords). The morphological analyzer 42 then determines the part of speech of each keyword.

A keyword ID generator 43 detects keywords that have not yet been registered in a keyword table database 14 from the keywords produced by the morphological analyzer 42, and the keyword ID generator 43 produces a keyword ID identifying each detected unregistered keyword.

A keyword score assigning unit 44 assigns a score to each keyword. The score refers to a weight indicating the importance level of each keyword. The keyword score assigning unit 44 determines a score of each keyword depending on the part of speech of the keyword and the occurrence frequency. For example, keywords of nouns are generally of high importance, and thus higher scores are assigned to keywords of nouns than keywords of other parts of speech. In the determination of the score, the keyword score assigning unit 44 also takes into account the occurrence frequency of keywords such that keywords which occur more frequently have higher scores. Thus, the keyword score assigning unit 44 determines scores such that a high score is assigned to a keyword of noun with high occurrence frequency, while a low score is assigned to a keyword of a part of speech other than noun and having low occurrence frequency.

The mail table manager 45 produces a mail table for storing the contents of mail and a mail title in association with a mail ID, and stores the produced mail table in a mail table database 13. If the keywords produced by the morphological analyzer 42 include one or more keywords that have not yet registered in the keyword table database 14, a keyword table manager 46 produces a keyword table for each unregistered keyword. Each unregistered keyword is described in a produced keyword table in association with an assigned keyword ID and stored in the keyword table database 14. A mail keyword table manager 47 produces a mail keyword table for each keyword ID. Each keyword ID and a score assigned thereto are described in association with an assigned mail ID in a mail keyword table and stored in the mail keyword table database 15.

The receiving unit 16 extracts a signal of a channel from broadcast waves received via an antenna 5, and supplies the extracted signal to a subtitle extractor 17, a program recording unit 22, and a content table manager 24.

The subtitle extractor 17 extracts subtitle information of a broadcast program from the signal of the channel supplied from the receiving unit 16, and supplies the extracted subtitle information to a subtitle keyword extractor 18.

The subtitle keyword extractor 18 extracts keywords from the subtitle information supplied from the subtitle extractor 17, and stores the created subtitle keyword table in the subtitle keyword table database 19.

In the subtitle keyword extractor 18, a morphological analyzer 62 performs morphological analysis on the text data of the subtitle information extracted by the subtitle extractor 17, and divides the text data into morphemes (keywords) and determines the part of speech of each keyword.

If the keywords produced by the morphological analyzer 62 includes keywords that have not yet been registered in the keyword table database 14, a keyword ID generator 61 produces a keyword ID identifying each unregistered keyword.

The keyword score assigning unit 63 is similar to the keyword score assigning unit 44 and is configured to assign a score to each keyword.

If the keywords produced by the morphological analyzer 62 includes keywords that have not yet been registered in the keyword table database 14, a keyword table manager 64 produces a keyword table for each unregistered keyword. Each unregistered keyword is described in a produced keyword table in association with an assigned keyword ID and stored in the keyword table database 14. Note that, for example, a few ten thousand keywords may be registered in advance in the keyword table database 14.

A subtitle keyword table manager 65 produces a subtitle keyword table in which each keyword ID and an assigned score are described in association with a channel, and stores the produced subtitle keyword table in the subtitle keyword table database 19.

A keyword comparison unit 20 controls a similarity calculation unit 71 to calculate the similarity between the content described in the electronic mail and a scene of a broadcast program being received in accordance with the mail keyword tables registered in the mail keyword table database 15 for each mail ID and the subtitle keyword tables registered in the subtitle keyword table database 19 for each channel. Furthermore, the keyword comparison unit 20 controls a similarity judgment unit 72 to compare the similarity calculated by the similarity calculation unit 71 with a predetermined threshold value to judge whether the calculated similarity is high thereby determining whether the current scene is one that is requested to be recorded by the electronic mail. The determination result is supplied together with the mail ID to a record request information generator 21.

If the judgment result supplied from the keyword comparison unit 20 indicates that the current scene has high similarity, the record request information generator 21 produces record request information and supplies it to the program recording unit 22. In accordance with the record request information, the program recording unit 22 records the program.

In accordance with the supplied record request information, the program recording unit 22 records the scene of the program received by the receiving unit 16. The recorded information is stored in a recorded program data storage unit 23, and associated information, including record request information and information indicating a record start time and a record end time, is supplied to the content table manager 24 and a mail content table manager 26.

The content table manager 24 produces a content table in accordance with the record request information and the record start time and the record end time 1. The produced content table is stored in the content table database 25. Furthermore, the content table manager 24 controls an EPG acquisition unit 24a to read information associated with the program (content) to be registered, and the content table manager 24 registers the read information associated with the program in the content table.

The mail content table manager 26 produces a mail content table in accordance with the record request information and the content tables registered in the content table database 25, and registers it in a mail content table database 27. In this process, the mail content table manager 26 controls a mail ID search unit 81 to search mail content table database 27 for the mail ID of interest to determine whether the mail ID is already registered in the mail content table database 27. If an already registered mail content table associated with the mail ID of interest ID is found, the mail content table is updated. If no such mail content table is found, a new mail content table is produced. In the case where an already registered mail content table is found, the mail content table manager 26 controls a similarity comparison unit 82 to determine the similarity of the registered content data to determine a position at which to insert new content information.

A GUI (Graphical User Interface) manager 28 produces a GUI for searching for and playing back recorded programs, in accordance with mail keyword tables registered in a mail keyword table database 25, mail content tables registered in a mail content table database 27, and recorded program data stored in the recorded program data storage unit 23, and the GUI manager 28 displays the resultant GUI on the display 25.

A primary keyword information generator 91 accesses the mail keyword table database 15 to read mail keyword tables, and extracts a keyword a with highest score for each mail ID. The extracted keywords are displayed as primary keywords on the display 6.

If a user operates the operation unit 30 to move a pointer so as to point to a particular primary keyword displayed on the display 6, a mail title information generator 92 accesses the mail table database 13 to read a mail title and body text information of a electronic mail corresponding to a mail ID associated with the primary keyword pointed to by the pointer. The mail title and the body text information is displayed on the display 6.

A playback program information generator 93 reads, from the content table database 25, information associated with the program being read from the recorded program data storage unit 23 and played back by a playback unit 29, and the playback program information generator 93 displays the read information in a superimposed manner.

A title thumbnail image generator 94 reads a frame image including a subtitle corresponding to a record start time from the recorded program data storage unit 23, for each program (content) included in a title list generated by a title list information generator 96, and the title thumbnail image generator 94 displays the produced frame images in the form of thumbnail images.

If a user operates the operation unit 30 to specify a particular content in the title list generated by the title list information generator 96 and displayed on the display 6 thereby issuing a command to play back the content, then the playback command unit 95 commands the playback unit 29 to play back the specified content.

The title list information generator 96 produces the title list in accordance with information described in mail content tables stored in the mail content table database 27 and information described in content tables stored in the content table database 25, and the title list information generator 96 displays the produced title list on the display 6. In this process, the title list information generator 96 controls a station information generator 101 so as to display a station name of each channel registered in a station table 101a, and controls a time information generator 102 to display a record start time and a record end time of each program.

In the example shown in FIG. 1, for ease of understanding, the recording/playback apparatus is configured to receive a single channel of broadcast wave. In practice, to receive all channels, the recording/playback apparatus may be configured to include as many sets of receiving and recording parts including the receiving unit 16 and the program recording unit 22 as there are channels, although only one set of receiving and recording parts is shown in FIG. 1. In the case where the recording/playback apparatus is configured to receive only one channel of program at a time, the channel may be sequentially switched at predetermined intervals.

Figure 2:
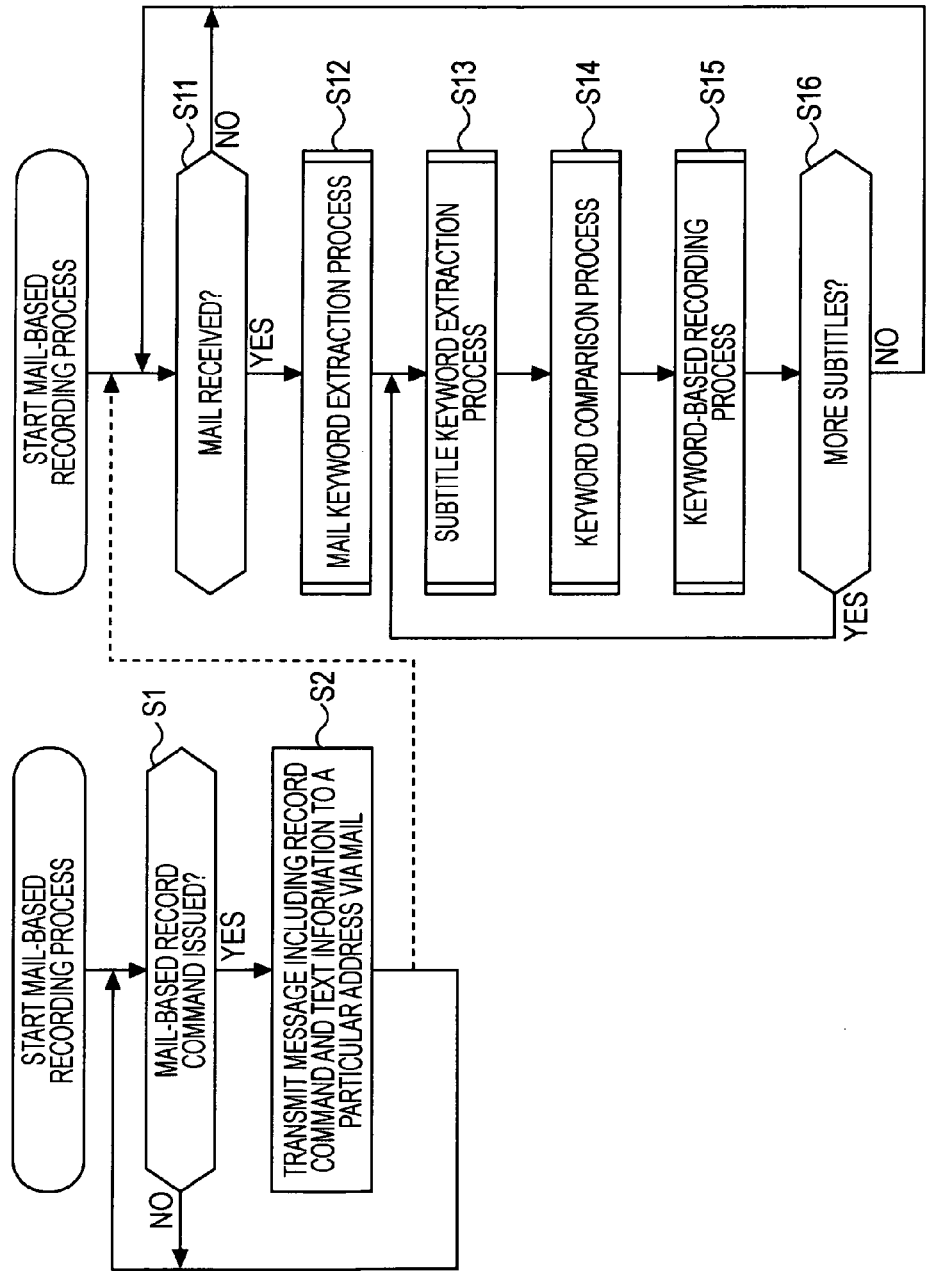
FIG. 2 is a flow chart associated with a mail-based recording process.

A mail-based recording process is described below with reference to a flow chart shown in FIG. 2.

Figure 3:
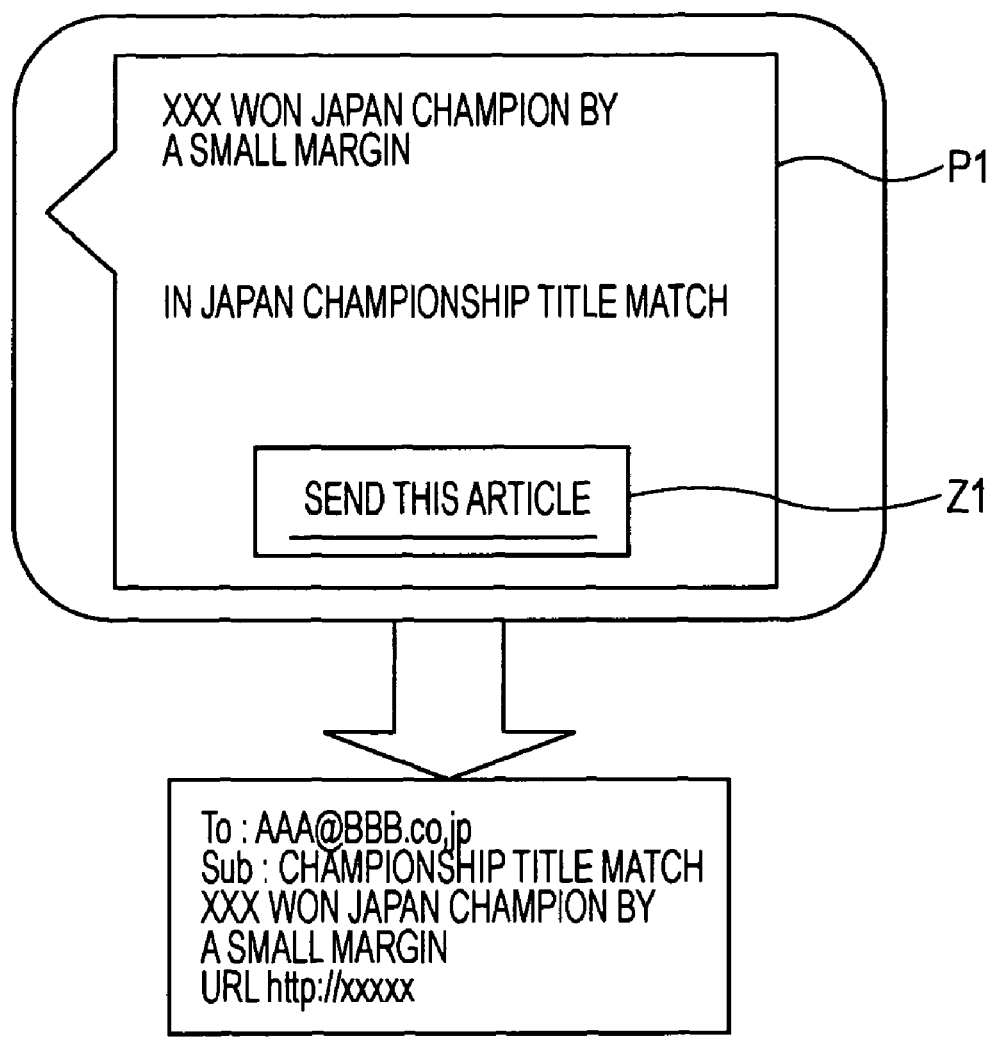
FIG. 3 is a diagram provided for an explanation of a mail-based recording process.

In step S1, the communication unit 113 of the portable terminal 2 determines whether a record command has been issued via a mail. If not so, step S1 is performed repeatedly until it is determined that the record command has been issued. More specifically, in an example shown in FIG. 3, when a news article "XXX won Japan champion by a small margin in a Japan championship title match" is displayed on the display 112 as denoted by reference numeral P1 in FIG. 3, if an operation button Z1 marked "Send this article" is clicked, then a mail with address information "To: AAA@BBB.co.jp", and a title "Sub: XXX won Japan Champion by a small margin in Japan championship title match" is produced as shown on the bottom of FIG. 3. If the operation unit 30 is operated, it is determined in step S1 that the command has been issued to record a scene corresponding to the content of the mail "XXX won Japan Champion by a small margin in Japan championship title match". Thus, in next step S2, the communication unit 113 transmits the mail shown on the bottom of FIG. 3 to the mail server 4 via the network 3. Note that in FIG. 3, "To: AAA@BBB.co.jp" is an e-mail address pointing to the recording/playback apparatus 1. Thus, more strictly speaking, when a mail with an e-mail address pointing to the recording/playback apparatus 1 is transmitted, it is determined that the record command has been issued by mail.

In step S11, the mail acquisition unit 11 repeatedly accesses the mail server 4 via the network 3 at predetermined intervals to determine whether there is a mail addressed to the recording/playback apparatus 1. Step S11 is performed repeatedly until it is determined that there is a mail addressed to the recording/playback apparatus 1. For example, in the case where the mail addressed to the recording/playback apparatus 1 was transmitted in step S2, the determination in step S11 is affirmative, and thus the processing flow proceeds to step S12.

In step S12, a mail keyword extraction process is performed.

Figure 4:
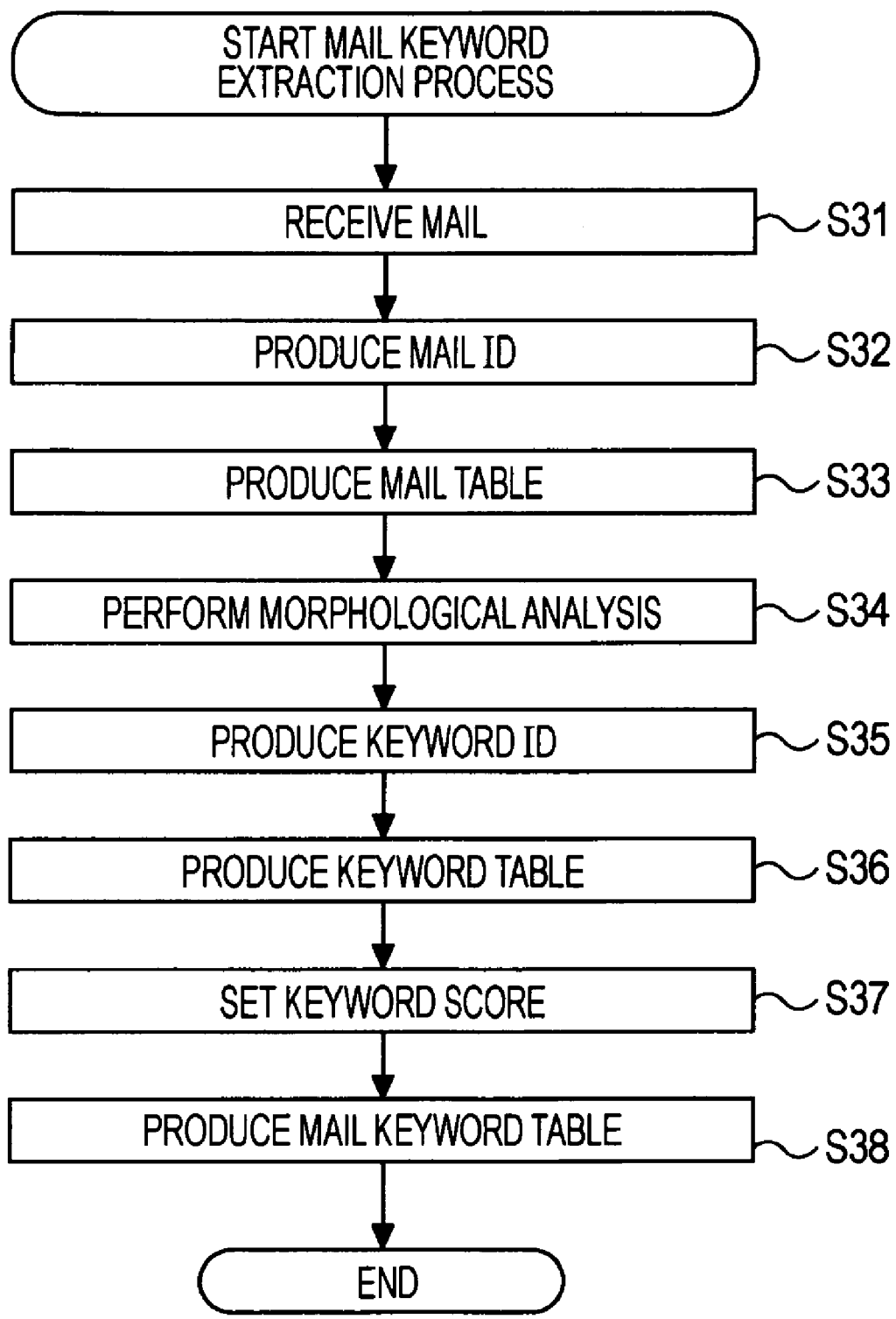
FIG. 4 is a flow chart associated with a mail keyword extraction process.

The mail keyword extraction process is described below with reference to a flow chart shown in FIG. 4.

In step S31, the mail acquisition unit 11 acquires the electronic mail addressed to the recording/playback apparatus 1 and supplies the acquired electronic mail to the mail keyword extraction unit 12.

In step S32, the mail ID generator 41 produces a mail ID identifying the electronic mail supplied from the mail acquisition unit 11 and supplies the produced mail ID to the mail table manager 45.

In step S33, the mail table manager 45 produces a mail table in accordance with the electronic mail supplied from the mail acquisition unit 11 and the mail ID, and registers the produced mail table in the mail table database 13. In the mail table, as shown in FIG. 5, a mail title and body information are described in association with the mail ID.

In step S34, the morphological analyzer 42 performs morphological analysis on the mail title and the body information of the electronic mail supplied from the mail acquisition unit 11, and determines the part of speech of each keyword detected as a result of the morphological analysis.

In step S35, the keyword ID generator 43 if the keywords obtained as the result of the morphological analysis performed by the morphological analyzer 42 include keywords that have not yet been registered in the keyword table database 14, the keyword ID generator 43 produces a keyword ID individually for each of such unregistered keywords, and supplies the produced keyword IDs to the keyword table manager 46. For keywords which have already been registered in the keyword table database 14, the keyword ID generator 43 assigns the same keyword IDs as those registered in the keyword table database 14 to the respective keywords.

In step S36, the keyword table manager 46 produces a keyword table such as that shown in FIG. 6 in accordance with the keyword IDs assigned to the respective keywords, and the keyword table manager 64 registers the produced keyword table in the keyword table database 14. In each keyword table, as shown in FIG. 6, a keyword is registered in association with an assigned keyword ID.

In step S37, the keyword score assigning unit 44 assigns a score to each keyword depending on the occurrence frequency and the part of speech of each keyword, in accordance with the keyword information obtained as the result of the morphological analysis performed by the morphological analyzer 42 and supplies the result to the mail keyword table manager 47.

In step S38, the mail keyword table manager 47 produces a mail keyword table such as that shown in FIG. 7 in accordance with the mail ID, the keyword ID, and the score, and registers the resultant mail keyword table in the mail keyword table database 15. In the mail keyword table, as shown in FIG. 7, the keyword ID and the score are described in association with the mail ID.

Thus, in the process described above, if an electronic mail is received, a mail table, a keyword table, and a mail keyword table are produced in accordance with the electronic mail and registered respectively in the mail table database 13, the keyword table database 14, and the mail keyword table database 15. As a result, scores are assigned to keywords included in the electronic mail, and the keywords and the assigned scores are registered in association with the electronic mail.

Returning to the flow chart shown in FIG. 2, the explanation is continued below.

If the mail keyword extraction process in step S12 is completed, then in step S13, the subtitle keyword extraction process is performed.

The subtitle keyword extraction process is described below with reference to a flow chart shown in FIG. 8.

In step S51, the receiving unit 16 receives, via the antenna 5, a broadcast program signal transmitted in the form of a broadcast wave and supplies the received signal to the subtitle extractor 17, the program recording unit 22, and the content table manager 24.

In step S52, the subtitle extractor 17 extracts subtitle information from the received broadcast program signal and supplies the extracted subtitle information to the subtitle keyword extractor 18.

In step S53, the morphological analyzer 62 of the subtitle keyword extractor 18 performs morphological analysis on the subtitle information supplied from the subtitle extractor 17 and determines the part of speech of each keyword.

In step S54, the keyword ID generator 61 assigns keyword ID individually for each of keywords obtained as a result of the morphological analysis performed by the morphological analyzer 62. More specifically, for keywords which have not yet been registered in the keyword table database 14, the keyword ID generator 61 produces a keyword ID individually for each of such keywords. For keywords which have already been registered in the keyword table database 14, the keyword ID generator 43 assigns the same keyword IDs as those registered in the keyword table database 14 to the respective keywords.

In step S55, the keyword table manager 64 produces a keyword table such as that shown in FIG. 6 in accordance with the keyword IDs assigned to the respective keywords, and the keyword table manager 64 registers the produced keyword table in the keyword table database 14.

In step S56, in accordance with the keyword information obtained as a result of the morphological analysis performed by the morphological analyzer 62, the keyword score assigning unit 63 assigns a score to each keyword depending on the occurrence frequency and the part of speech of each keyword, and the keyword score assigning unit 63 supplies the result to the subtitle keyword table manager 65.

In step S57, the subtitle keyword table manager 65 produces a subtitle keyword table such as that shown in FIG. 9 in accordance with channels, keyword IDs, and scores, and the subtitle keyword table manager 65 registers the produced subtitle keyword table in the subtitle keyword table database 19. In the subtitle keyword table, as shown in FIG. 9, the keyword IDs and the scores are described in association with the channel.

Thus, in the process described above, the keyword table and the subtitle keyword table are produced from the subtitle information of the channel received by the receiving unit 16, and they are registered in the keyword table database 14 and the subtitle keyword table database 19. As a result, scores are assigned to keywords included in the subtitle information, and keywords and assigned scores are registered in association with the channel.

Returning to the flow chart shown in FIG. 2, the explanation is continued below.

If the subtitle keyword extraction process in step S13 is completed, then the process proceeds to step S14 to perform a keyword comparison process.

Figure 10:
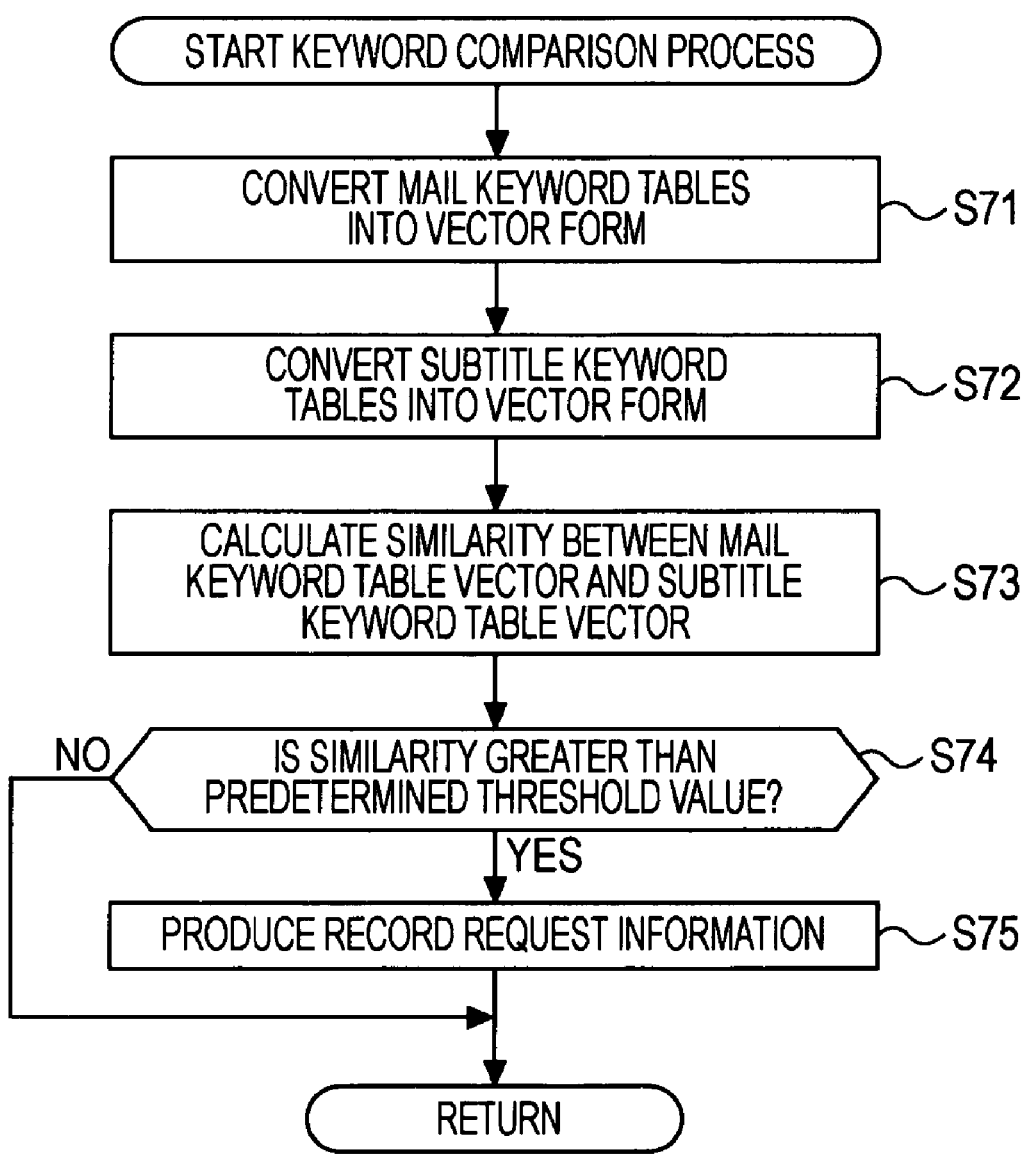
FIG. 10 is a flow chart associated with a keyword comparison process.

Referring to a flow chart shown in FIG. 10, the keyword comparison process is explained below.

In step S71, the similarity calculation unit 71 of the keyword comparison unit 20 accesses the mail keyword table database 15 and converts the mail keyword tables read therefrom into a vector form.

In step S72, the similarity calculation unit 71 accesses the subtitle keyword table database 19 and reads subtitle keyword tables associated with one subtitle from the subtitle keyword table database 19.

In step S73, the similarity calculation unit 71 calculates the similarity using a vector of mail keyword tables and a vector of subtitle keyword tables in accordance with equation (1) shown below.

$$\text{Similarity} = \frac{\vec{A} \cdot \vec{B}}{|\vec{A}||\vec{B}|} \quad (1)$$

where vector A (with a right-pointing arrow disposed on top) is the vector of mail keyword tables, and vector B (with a right-pointing arrow disposed on top) is the vector of subtitle keyword tables. That is, the similarity is given by the cosine of the angle between vectors An and B. In a specific example shown in FIG. 11, mail keywords include a keyword O having a score an and a keyword P having a score b as shown on the top of FIG. 11, while subtitle keywords include a keyword O having a score c, a keyword Q having a score d, a keyword R having a score e, and a keyword S having a score f, and thus vector A is (a, b, 0, 0, 0), and vector B is (c, 0, d, e, f). Therefore, the similarity is calculated as follows: ((a×c+b× 0+0×d+0×e+0×f)/($\sqrt{(a^2+b^2+0^2+0^2+0^2)}$×$\sqrt{(a^2+0^2+c^2+d^2+e^2)}$))

In step S74, the similarity judgment unit 72 determines whether the calculated similarity is greater than a predetermined threshold value. In a case where it is determined in step S74 that the calculated similarity is greater than the predetermined threshold value, the processing flow proceeds to step S75. In step S75, the similarity judgment unit 72 determines that there is high similarity between the current subtitle information and the content of the electronic mail, i.e., a scene similar to the content of the electronic mail is now being broadcast. Thus, the similarity judgment unit 72 supplies information associated with the subtitle keyword table, the mail keyword table, and the similarity to the record request information generator 21. In accordance with the information associated with the subtitle keyword table, the mail keyword table, and the similarity, the record request information generator 21 produces record request information such as that shown in FIG. 12 and supplies the produced record request information to the program recording unit 22. As shown in FIG. 12, the record request information is produced in the form of a table in which the channel and the similarity are described in association with the mail ID.

On the other hand, in case where it is determined in step S74 that the similarity is lower than the predetermined threshold value, step S75 is skipped, and the process is ended.

Thus, in the process described above, the similarity between the keywords included in text data of the electronic mail and the subtitle information of the program being broadcast is calculated, and if the similarity is equal to or higher than the predetermined threshold value, it is determined that a scene being currently broadcast is similar to the content of the electronic mail. Thus, it is determined that the scene should be recorded, and record request information indicating that the current program should be recorded is produced.

Returning to the flow chart shown in FIG. 2, the explanation is continued below.

If the keyword comparison process in step S14 is completed, then in step S15, a keyword-based recording process is performed.

Referring to a flow chart shown in FIG. 13, the keyword-based recording process is explained below.

In step S91, the program recording unit 22 determines whether record request information has been received from the record request information generator 21. For example, in a case where record request information is produced and transmitted in step S75 described above, the determination in step S91 is affirmative, and thus the processing flow proceeds to step S92.

In step S92, the program recording unit 22 records the program specified by the record request information for a predetermined period starting at the time at which the record request information is received, and the program recording unit 22 sequentially stores the recorded program (content) information in the recorded program data storage unit 23. In this recording process, the program recording unit 22 supplies the record request information and information indicating the record start time to the content table manager 24 and the mail content table manager 26.

In step S93, the content table manager 24 controls the EPG acquisition unit 24a to acquire the title such as "News xxx" of the program.

Figure 14:
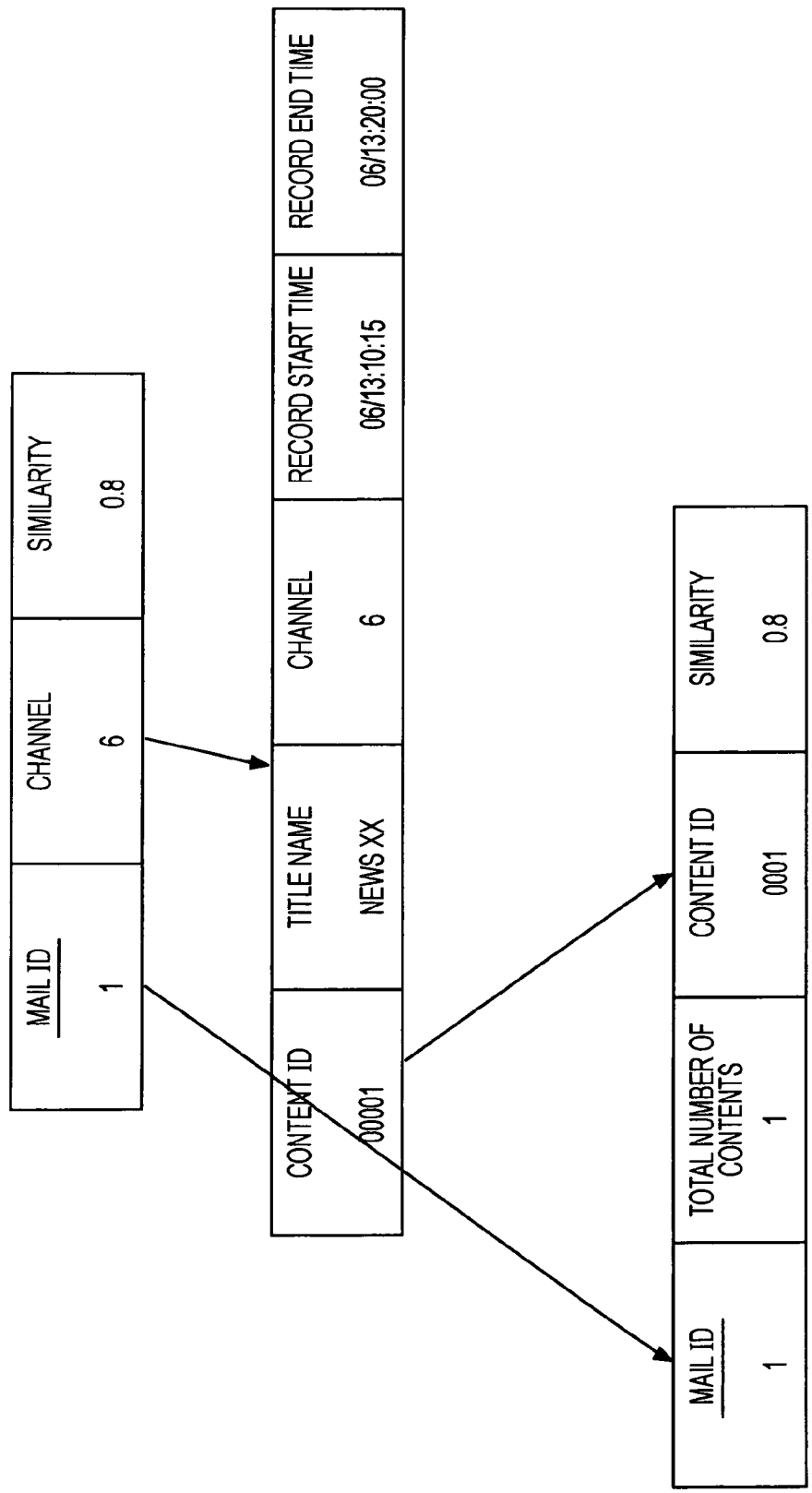
FIG. 14 is a diagram provided for an explanation of a keyword-based recording process.

In step S94, the content table manager 24 produces a content table in accordance with the record request information and registers the produced content table in the content table database 25. More specifically, in a case where the record request information is such as that shown on the top of FIG. 14, then a content table such as that shown in the middle of FIG. 14 is produced. In the example of the record request information shown on the top of FIG. 14, the mail ID is 1, the channel is 6, and the similarity is 0.8. In this specific case, the content table manager 24 generates, for example, "00001" as the content table ID and assigned it to the content table as shown in FIG. 14. The content table manager 24 adds further information to the content table. More specifically, "News xx" acquired by the EPG acquisition unit 24a is described as the title of the program, channel 6 is specified as the channel to be recorded, "06/13:10:15" (2006) indicating the date and time at which the recording was started is described as the record start time, and "06/13:10:20" at which the recording should be ended is determined from the record start time and described as the record end time. Thus, for example, the content table is produced as shown in the middle of FIG. 14.

In step S95, the mail content table manager 26 controls the mail ID search unit 81 to access the mail content table 27 to determine whether the mail ID included in the record request information has already been registered. In a case where it is determined in step S95 that the mail ID included in the record request information is that which has not occurred before and thus the mail ID has not yet been registered, the processing flow proceeds to step S96.

In step S96, in accordance with the record request information and the content table registered in the content table database 25, the mail content table manager 26 produces a new mail content table and registers the produced mail content table in the mail content table database 27. More specifically, for example, in a case where the record request information shown on the top of FIG. 14 and the content table shown in the middle of FIG. 14 are given, then the mail content table manager 26 produces a mail content table as shown on the bottom of FIG. 14. More specifically, in this example, the mail content table is described such that the same mail ID as that described in the record request information is described as the mail ID, the total number of contents is defined as 1 because the mail content table is newly produced, the content ID indicated by the content table is described as the content ID, and the same similarity as that described in the record request information is described as the similarity. The resultant mail content table is registered in the mail content table database 27.

On the other hand, in a case where it is determined in step S95 that the mail ID described in the record request information has already been registered in the mail content table database 27, that is, in the case where a mail content table associated with the mail ID described in the record request information exists in the mail content table database 27, the processing flow proceeds to step S97.

In step S97, the mail content table manager 26 controls the similarity comparison unit 82 to compare the similarity of the record request information to be registered and the similarity of the mail content table existing in the mail content table database 27 thereby to determine which is higher in similarity.

In step S98, in accordance with the comparison result, the mail content table manager 26 updates the mail content table so that a content ID having higher similarity is located at a higher-order position while a content ID having lower similarity is located at a lower-order position, and the mail content table manager 26 registers the result in the mail content table database 27. More specifically, for example, in a case where a mail content table similar to that shown on the bottom of FIG. 14 already exists as shown on the top of FIG. 15, and a new content table indicates that the content ID is "00002", the title is "News xx", the channel is "4", the record start time is "06/13:11:15", and the record end time is "06/13:11:30", and furthermore, the similarity of the content table to be newly registered is 0.9 then the comparison of the similarity performed by the similarity comparison unit 82 under the control of the mail content table manager 26 indicates that the new content table is higher in similarity because the similarity of the already existing mail content table is 0.8. Thus it is determined that the new content table should be located at a higher-order position than the existing content table. Thus, as shown in the middle of FIG. 15, the mail content table manager 26 inserts information associated with the new content table between the total number of contents and the content ID in the present mail content table, thereby updating the mail content table.

Figure 15:
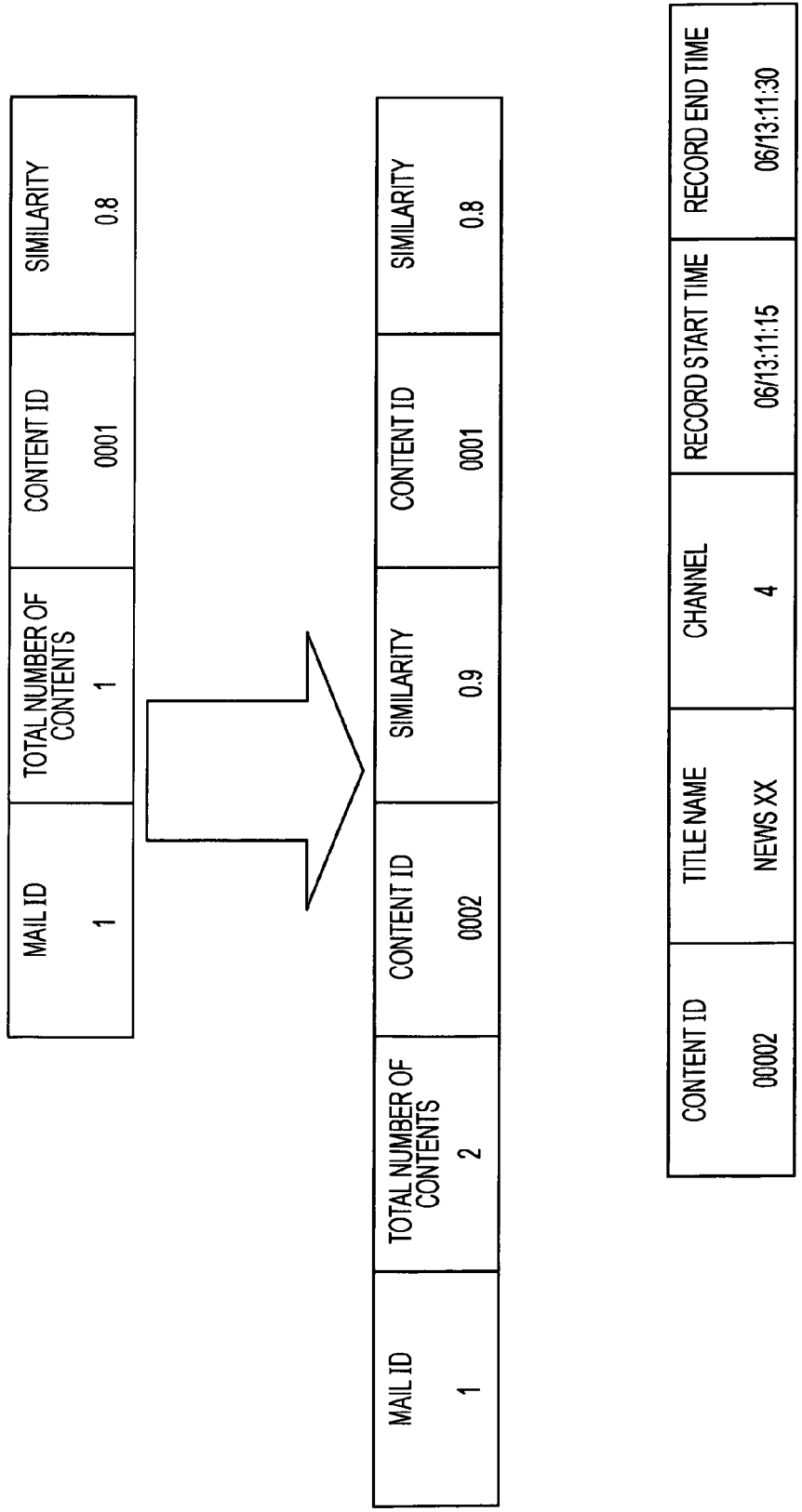
FIG. 15 is a diagram provided for an explanation of a keyword-based recording process.
Figure 16:
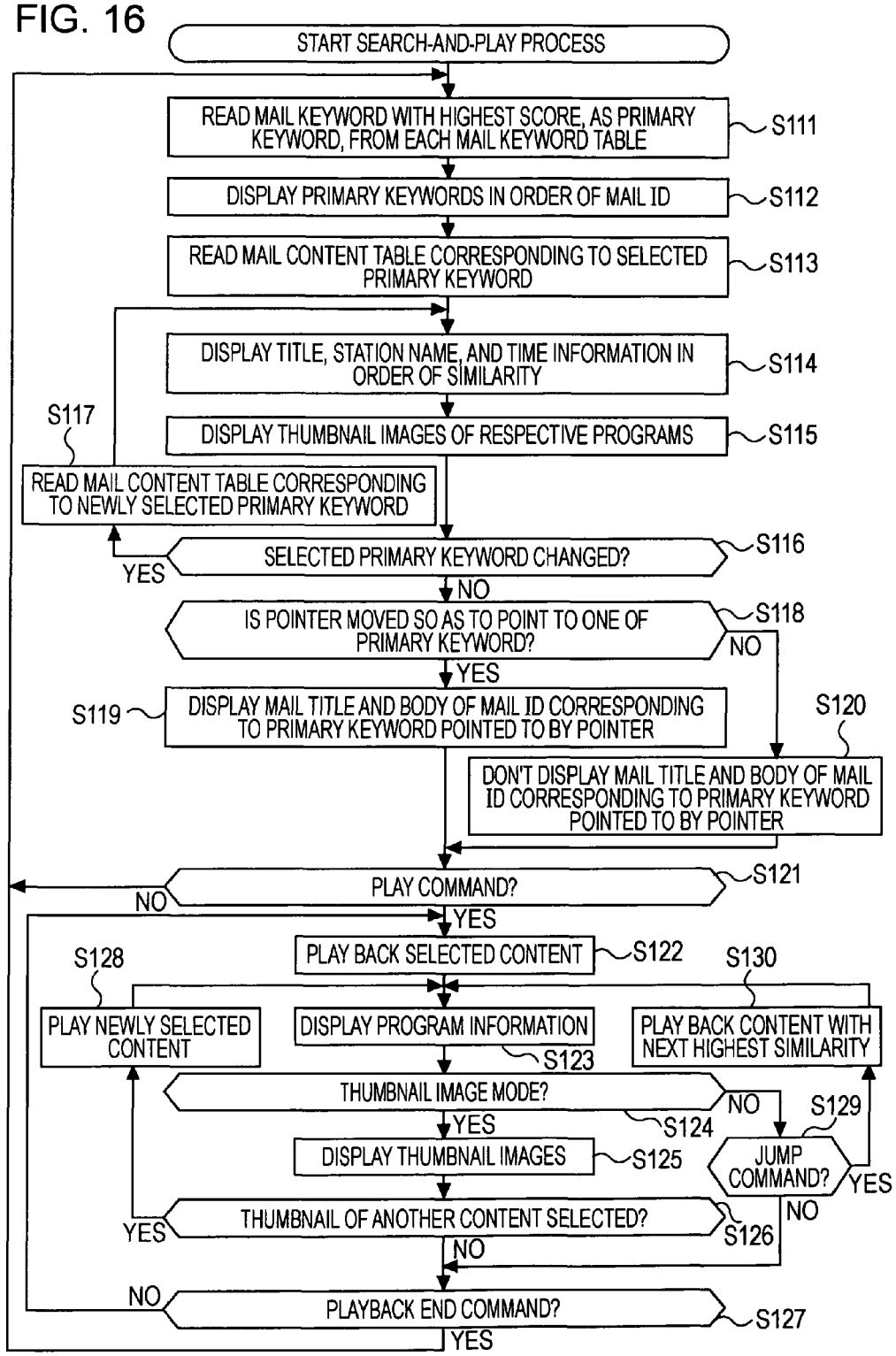
FIG. 16 is a flow chart associated with a search-and-playback process.

As a result, as shown in the middle of FIG. 15, in the updated mail content table, information is described left to right as follows: the mail ID is described as "1", the total number of contents is described as "2", the content ID of the newly added program is assigned as "0002", the similarity of the newly added content is described as "0.9", the content ID of the existing content is described as "0001", and the similarity of the existing content is described as "0.8". Thus, when a new content is registered, the higher the similarity, the new content is located at a more leftward position close to the field of the total number of contents in FIG. 15.

In a case where it is determined in step S91 that no record request information has been received, the process from step S92 to step S98 is skipped, and the process is ended.

Thus, in the process described above, in response to receiving record request information, a specified program is recorded for a predetermined period, and information associated with the recorded program is registered as a content table in the content table database 25 and as a mail content table in the mail content table database 27.

Returning to the flow chart shown in FIG. 2, the explanation is continued below.

If the keyword-based recording process in step S15 is completed, the processing flow proceeds to step S16. In step S16, the subtitle extractor 17 determines whether a next subtitle has been supplied. If a next subtitle has been supplied, the processing step returns to step S13 to produce a subtitle keyword table and repeat the above-described process. Thus, the process from step S13 to step S16 is performed repeatedly on a subtitle-by-subtitle basis as long as there is a subtitle to process.

In a case where it is determined in step S16 that there is no more subtitle, the processing flow returns to step S11 to repeat the process from step S11.

Thus, in the process described above, simply by transmitting an electronic mail including text information representing the content a user is interested in, such as a news article, to the recording/playback apparatus 1 from the portable terminal 2, a scene having high similarity to keywords included in the text information described in the electronic mail is automatically recorded.

In a state in which scenes having high similarity to keywords included in the text information described in electronic mails have been recorded via the process described above, it is possible to search for a particular scene and play back the scene as described below.

In step S111, the primary keyword information generator 91 accesses the mail keyword table 15 to read a keyword having a highest score for each mail ID.

Figure 17:
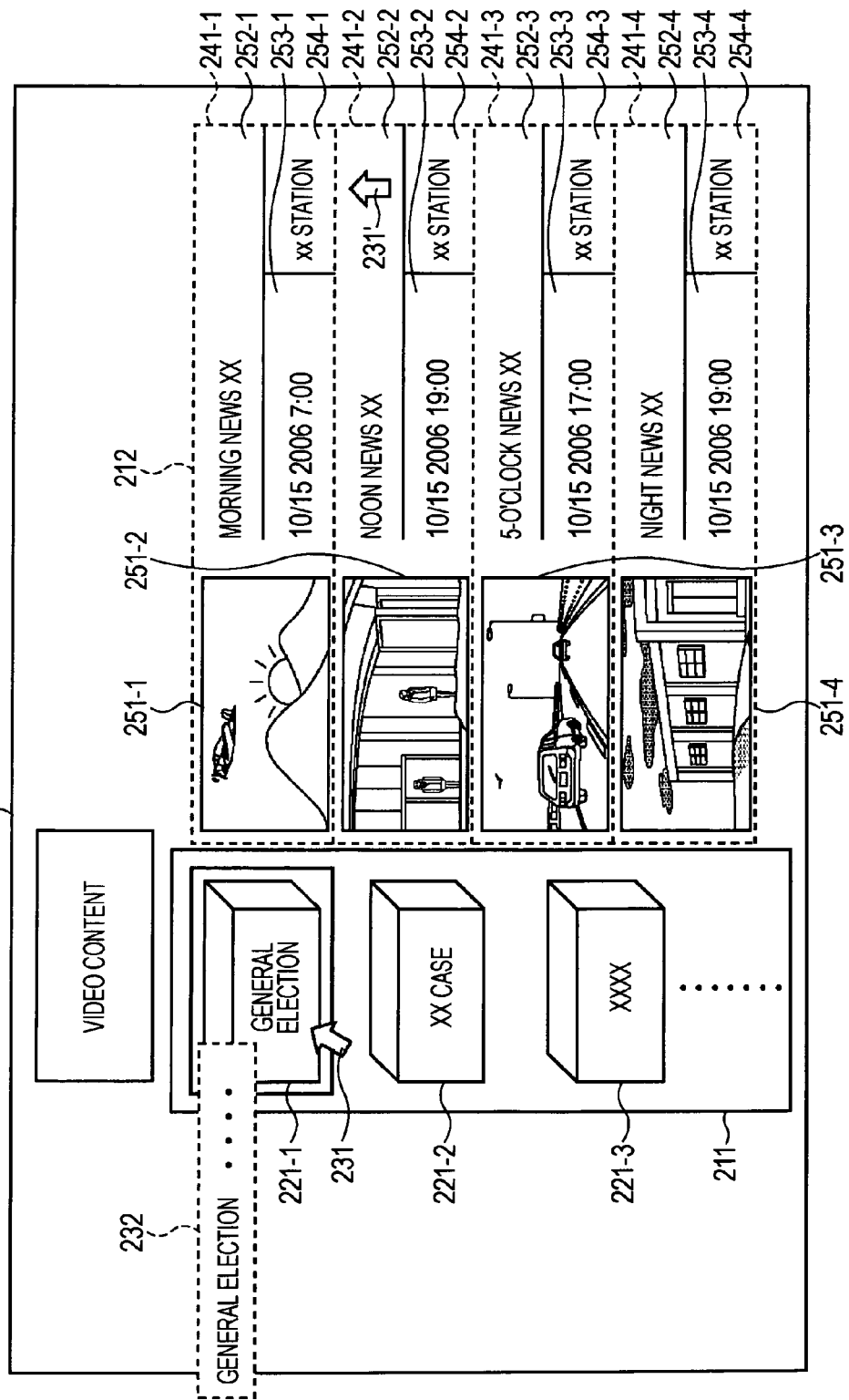
FIG. 17 is a diagram illustrating an example of a GUI screen.

In step S112, the GUI manager 28 displays a GUI 201 such as that shown in FIG. 17 on the display 6, and also displays, as priority keywords, keywords with highest scores for respective mail IDs, read by the primary keyword information generator 91.

In the example of the GUI 201 shown in FIG. 17, the primary keyword information generator 91 displays a primary keyword list 211 on the left-hand side of FIG. 17, in which following primary keyword display boxes are displayed in the form of icons from top to bottom: a primary keyword display box 221-1 in which "General Election" is displayed as a primary keyword; a primary keyword display box 221-2 in which "XX Case" is displayed as a primary keyword; and a primary keyword display box 221-3 in which "XXXX" is displayed as a primary keyword. The icons of the primary keyword display boxes 221-1 to 221-3 can be selected with a pointer 231 operable via the operation unit 30. In the specific example shown in FIG. 17, the icon of the primary keyword display box 221-1 is pointed to by the pointer 231 and thus this icon is selected.

In step S113, the title list information generator 96 accesses the mail content table database 27 to read a mail content table associated with the selected primary keyword. In the specific example shown in FIG. 17, a mail content table with a mail ID in which a highest sore is assigned to a keyword "General Election" is read from the mail content table database 27.

In step S114, in accordance with information described in the mail content table database 27, the title list information generator 96 selects contents in the order of decreasing similarity starting from the highest similarity and displays a list of selected contents in the title list display box 212 as shown in FIG. 17. In this process, the title list information generator 96 reads content tables from the content table database 25 in accordance with content IDs described in the mail keyword tables, and displays the content display boxes 241-1 to 241-4 as shown in FIG. 17.

The content display boxes 241-1 to 241-4 each include one of title display boxes 252-1 to 252-4, and "Morning News XX" is displayed in the title display box 252-1, "Noon News XX" is displayed in the title display box 252-2, "5-O'clock News XX" is displayed in the title display box 252-3, and "Night News XX" is displayed in the title display box 252-4.

The content display boxes 241-1 to 241-4 each include one of record start time display boxes 253-1 to 253-4. The title list information generator 96 controls a time information generator 102 to read content tables from the content table database 25 in accordance with content IDs described in the mail keyword tables, and displays time information described in the read content tables in the respective record start time display boxes 253-1 to 253-4. In the specific example shown in FIG. 17, "2006/10/15 7:00" is displayed in the record start time display box 253-1, "2006/10/15 19:00" is displayed in the record start time display box 253-3, "2006/10/15 17:00" is displayed in the record start time display box 253-3, and "2006/10/15 19:00" is displayed in the record start time display box 253-4.

Furthermore, the content display boxes 241-1 to 241-4 each include one of station name display boxes 254-1 to 254-4. The title list information generator 96 controls the station information generator 101 to read information associated with broadcast stations in accordance with channel numbers, and displays the acquired information in the respective station name display boxes 254-1 to 254-4. In the specific example shown in FIG. 17, "XX Station" is displayed in each of the station name display boxes 254-1 to 254-4. More specifically, the station information generator 101 includes a station table 101a in which station names are registered in association with channel numbers, and station names corresponding to channel numbers described in content tables are read from the station table 101a and displayed in the station name display boxes 254-1 to 254-4.

In step S115, the title thumbnail image generator 94 reads content tables corresponding to content IDs having high similarity in accordance with information described in the mail content table database 27, and reads record start times of the contents described in the content tables. The title thumbnail image generator 94 also accesses the recorded program data storage unit 23 to read frame images each including one subtitle recorded at the respective record start times. The title thumbnail image generator 94 converts the frame images into the form of thumbnail images and displays them in thumbnail image display boxes 251-1 to 251-4 as shown in FIG. 17. Note that thumbnail images displayed are not limited to those corresponding to the record start times, but thumbnails images corresponding to frame images recorded at other times may be displayed. For example, thumbnail images corresponding to frame images including subtitles having highest similarity may be displayed.

In step S116, the GUI manager 28 determines whether the operation unit 28 has been operated to change the selected primary keyword. If the pointer 231 is moved, for example, to the primary keyword display box 221-2 in FIG. 17, then the determination in step S116 is that the selected primary keyword has been changed, and thus the processing flow proceeds to step S117. In step S117, the GUI manager 28 reads a mail content table corresponding to the newly selected primary keyword from the mail content table database 27. The processing flow then returns to step S114. That is, in accordance with the primary keyword selected via the pointer 231, information displayed in the title list display box 212 is changed.

In a case where it is determined in step S116 that the selected primary keyword is not changed, the processing flow proceeds to step S118. In step S118, the mail title information generator 92 determines whether the pointer 231 has been moved to one of primary keyword display boxes 221-1 to 251-3. In the specific example shown in FIG. 17, the pointer 231 has been moved to the primary keyword display box 221-1. Thus, in this case, in step S119, the mail title information generator 92 accesses the mail table database 13 to read a mail table associated with a mail ID corresponding to the primary keyword display box 221-1 being pointed to by the pointer 231. The mail title information generator 92 displays, in a mail title/body display box 232, the mail title and the body of the mail described in the mail table so that a user can understand the title and the content of the electronic mail associated with the selected primary keyword. The mail title/body display box 232 may have a size that does not completely hide a primary keyword, although the number of characters displayed in the mail title/body display box 232 is limited.

In a case where it is determined in step S118 that the pointer 231 does not point to any one of the primary keyword display boxes 221-1 to 251-3, the processing flow proceeds to step S120. In step S120, the mail title information generator 92 deletes the mail title/body display box 232.

Thus, in the process described above, the recorded scenes are displayed in the order of decreasing similarity starting from the highest similarity for each mail ID corresponding to the selected primary keyword so that a user is allowed to easily find a desired scene. In the example shown in FIG. 17, four programs (contents) are displayed in the form of a list in the order of decreasing similarity starting from the highest similarity. The number of programs (contents) displayed is not limited to four. Alternatively, a different number of programs (contents) may be displayed. In a case where there are a greater number of programs (contents) than can be displayed on the screen with the limited size, hidden programs (contents) may be displayed by scrolling up or down the list.

In step S121, the playback command unit 95 determines whether the operation unit 30 has been operated to move the pointer to select one of the content display boxes 241-1 to 241-4 thereby to issue a command to play back the selected content. If it is determined that issuing of the playback command is not detected, the processing flow returns to step S111. In a case where, for example, the icon of the content display box 241-2 is selected with the pointer 231' as shown in FIG. 17, it is determined in step S121 that the command to play back the content with the tile "Noon news XXX" has been issued, and thus the processing flow proceeds to step S122.

In step S122, in the specific example shown in FIG. 17, the playback command unit 95 commands the playback unit 29 to display a content in accordance with a content ID having next highest similarity corresponding to the mail content table pointed to by the pointer 231'. The playback unit 29 searches the recorded program data storage unit 23 in accordance with the content ID to find the corresponding content. The content is read from the recorded program data storage unit 23 and displayed on the display 6.

Figure 18:
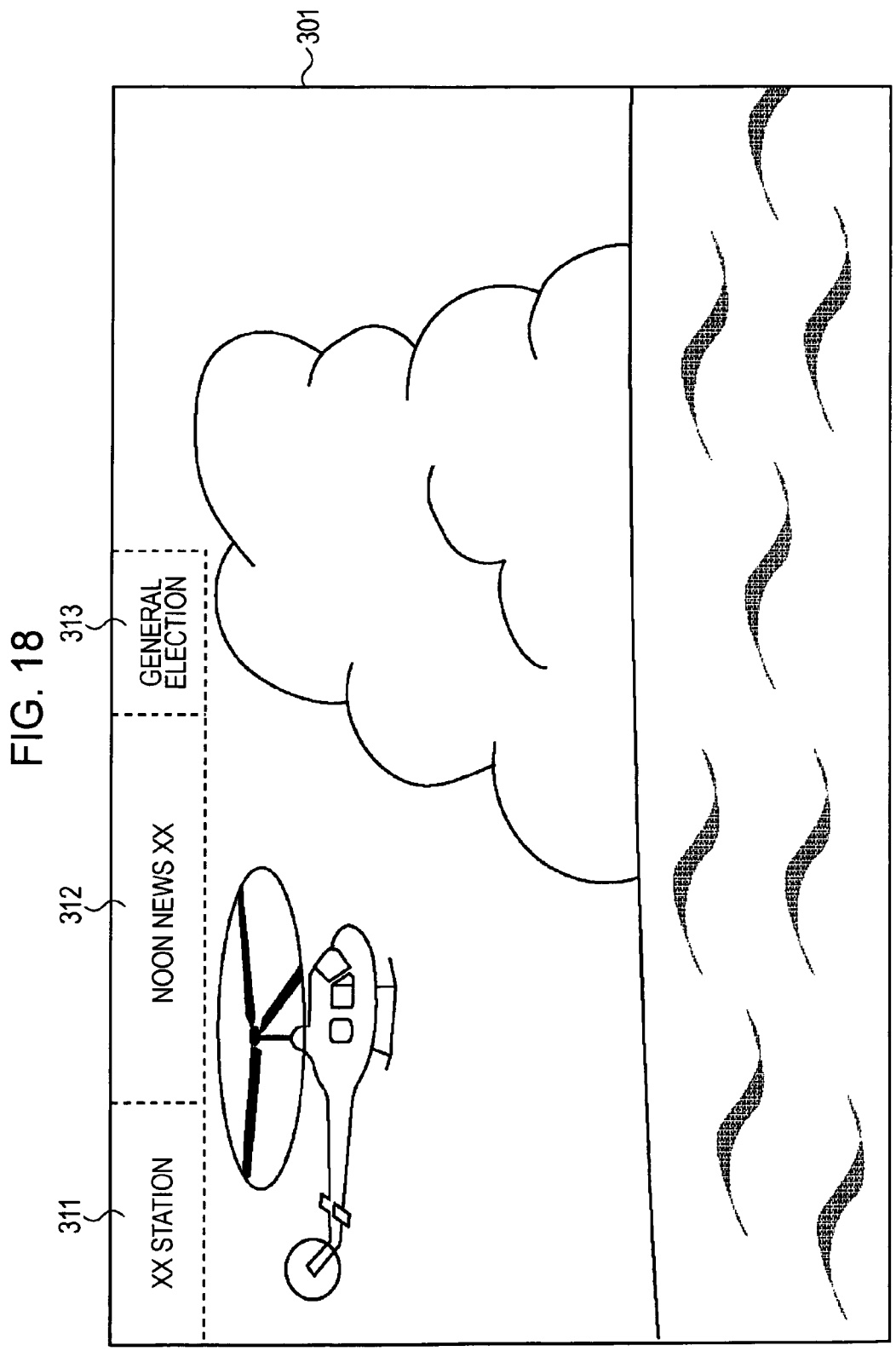
FIG. 18 is a diagram illustrating an example of playback screen.

In step S123, the playback program information generator 93 accesses the content table database 25 in accordance with the content ID and reads a content table corresponding to the content ID. In accordance with the read content table, the playback program information generator 93 displays a station name display box 311, a program title display box 312, and a primary keyword display box 313 such that they are superimposed on the image 301 being displayed, as shown in FIG. 18. In the specific example shown in FIG. 18, "XX Station" is displayed in the station name display box 311, "Noon News XX" is displayed in the program title display box 312, and "General Election" is displayed in the primary keyword display box 313. Displaying of information in such a manner allows a user to easily understand what content is being played back.

Figure 19:
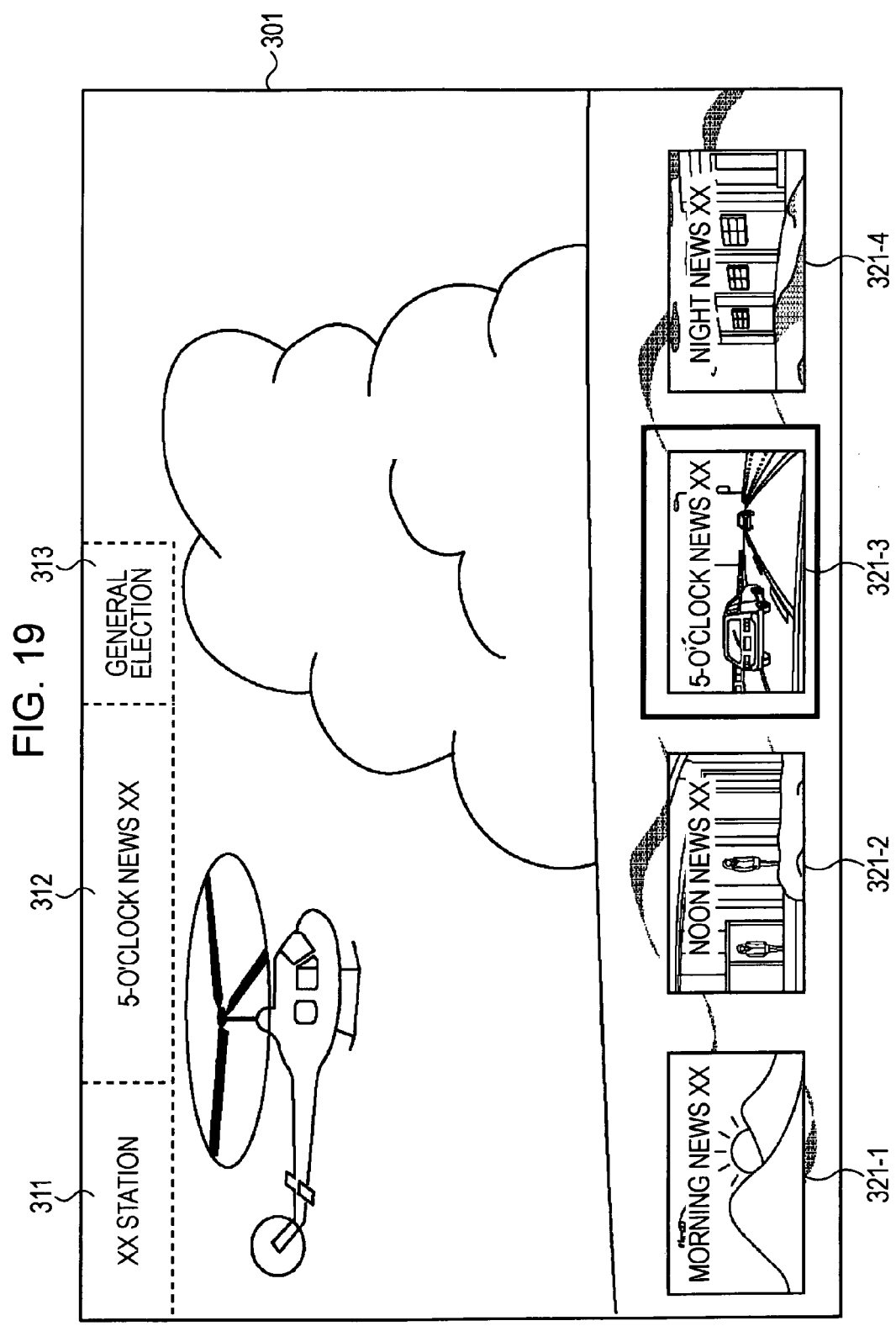
FIG. 19 is a diagram illustrating an example of playback screen.

In step S124, the title thumbnail image generator 94 determines whether the current operation is in a mode in which thumbnail images are displayed on the image screen 301 (hereinafter, this mode will be referred to simply as a thumbnail image mode). The thumbnail image mode may be switched on/off by clicking a particular icon (not shown). In a case where it is determined in step S124 that the thumbnail image mode is enabled, the processing flow proceeds to step S125. In step S125, the title thumbnail image generator 94 displays selectable thumbnail images, for example, as shown in FIG. 19. In the example shown in FIG. 19, thumbnail image display boxes 321-1 to 321-4 are displayed in an area below the image area 301. Note that the thumbnail images displayed in these thumbnail image display boxes 321-1 to 321-4 are similar to the thumbnail images displayed in the thumbnail image display boxes 251-1 to 251-4 shown in FIG. 17. Any of these thumbnail images can be selected using a pointer.

In step S126, the playback command unit 95 determines whether the pointer has been moved to another one of thumbnail image display boxes 321-1 to 321-4 to specify another content. For example, in FIG. 19, if the thumbnail image display box 321-3 is selected to specify a content to be displayed, the processing flow proceeds to step S128. In step S128, the playback command unit 95 command the playback unit 27 to play the newly selected content in accordance with the content ID described in the corresponding mail content table. The processing flow then returns to step S123. As a result, information displayed on the screen is switched. In the example shown in FIG. 19, in response to newly selecting the thumbnail image display box 321-3, an image of "5-O'clock News XX" is displayed in the playback image area 301, "XX Station" is displayed in the station name display box 311, "5-O'clock News XX" is displayed in the program title display box 312, and "General Election" is displayed in the primary keyword display box 313.

On the other hand, in a case where it is determined in step S126 that the selected thumbnail image of the content is not changed, the processing flow proceeds to step S127. In step S127, the playback command unit 95 determines whether a playback end command has been issued. In a case where the playback end command has not been issued (or the end of the content being played has not yet been reached), the processing flow returns to step S122. On the other hand, in a case where it is determined in step S127 that the playback end command has been issued or the end of the content has been reached, the processing flow returns to step S111.

In a case where it is determined in step S124 that the thumbnail image mode is disabled, the processing flow proceeds to step S129. In step S129, the playback command unit 95 determines whether the operation unit 30 has been operated to issue a content jump command. If it is determined that the content jump command has not been issued, the processing flow proceeds to step S127. Thus, when the thumbnail image mode is disabled, the playback is performed without displaying thumbnail image display boxes 321-1 to 321-4 as shown in FIG. 18.

In a case where it is determined in step S129 that the jump command has been issued, the process proceeds to step S130. In step S130, the playback command unit 95 commands the playback unit 29 to play back a content with next higher similarity. The processing flow then returns to step S123.

Thus, in the process described above, a content is searched for, and a detected content is played back. When the content is being played back, information associated with the content is also displayed so that a user can easily understand what content is being played back. Furthermore, the user is allowed to easily select a content to be played back.

As a result, simply by transmitting text information representing the content, a user is interested in, to the recording/playback apparatus from the portable terminal, the similarity between keywords included in the text information and the keywords included in subtitles of programs is evaluated, and a scene with high similarity to the content the user is interested in is automatically recorded.

In the embodiments described above, the recording/playback apparatus is configured to record scenes in accordance with text information transmitted from the portable terminal at a remote location. Alternatively, in accordance with a sentence input by a user, the recording/playback apparatus may search for a scene that the user will be interested in from already-recorded contents including subtitles, and may play back a detected scene. In this case, the operation can be performed in a similar manner to the embodiments described above except that contents received via broadcast waves are replaced by already recorded contents, and thus no further explanation thereof is given herein.

As described above, the embodiments of the present invention make it possible to selectively record or play back a particular scene in a program.

The sequence of processing steps described above may be performed by hardware or software. When the processing sequence is executed by software, the software in the form of a program may be installed from a storage medium onto a computer which is provided as dedicated hardware or may be installed onto a general-purpose computer capable of performing various processes in accordance with various programs installed thereon.

Figure 20:
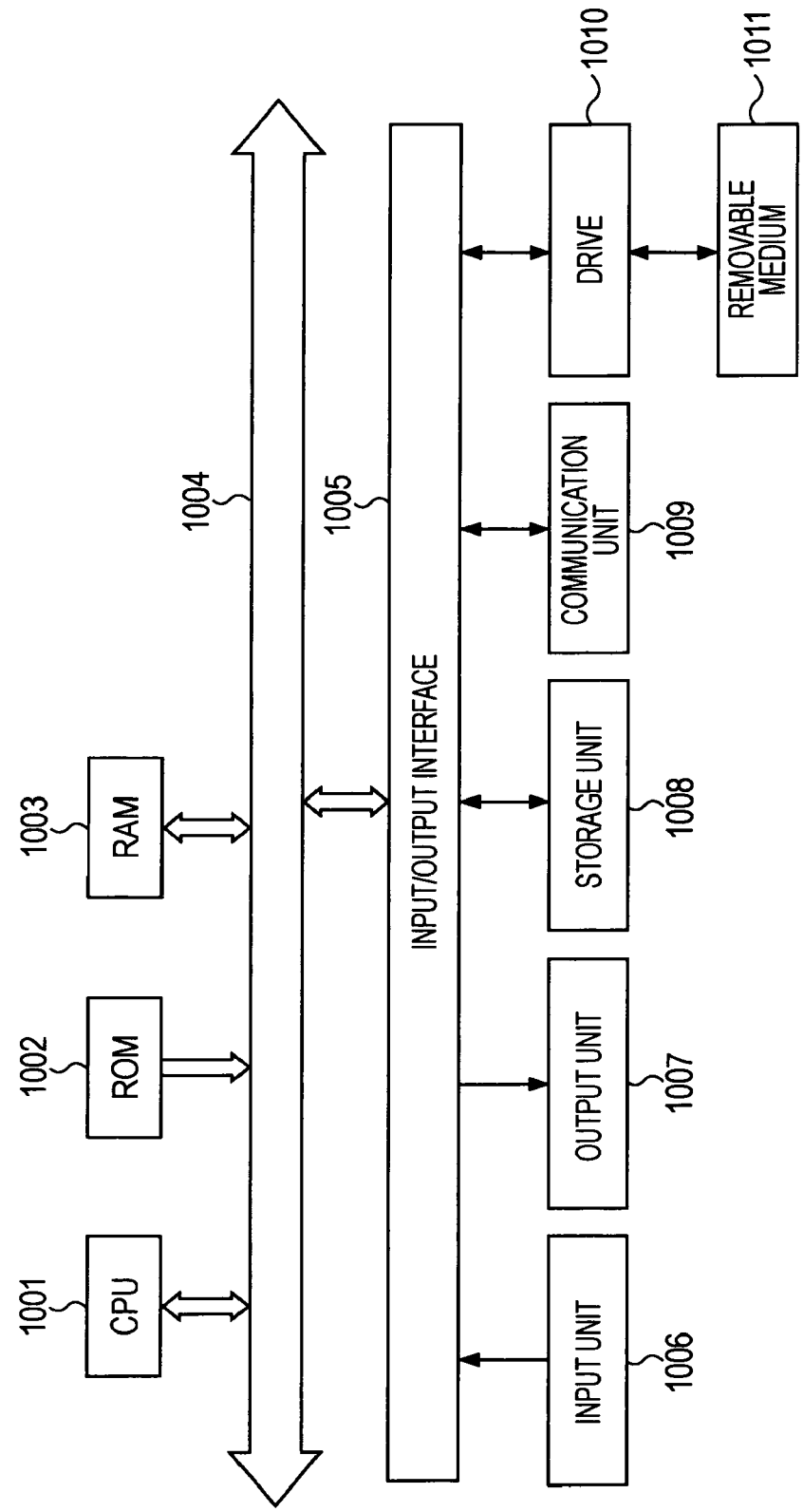
FIG. 20 is a diagram illustrating an example of a configuration of a personal computer.

FIG. 20 illustrates an example of a configuration of a general-purpose personal computer. The computer includes a CPU (Central Processing Unit) 1001. An input/output interface 1005 is connected to the CPU 1001 via a bus 1004. The bus 1004 is also connected to a ROM (Read Only Memory) 1002 and a RAM (Random Access Memory) 1003.

The input/output interface 1005 is connected to an input unit 1006 including a keyboard used by a user to input an operation command or data and an input device such as a mouse, an output unit 1007 adapted to output a playback image and a GUI image to the display, a storage unit 1008 such as a hard disk drive for storing programs and associated data, a communication unit 1009 including a LAN (Local Area Network) adapter or the like for performing communication via a network such as the Internet. The input/output interface 1005 is also connected to a drive 1010 adapted to read/write data from/to a removable medium 1011 such as a magnetic disk (for example, a floppy disk), an optical disk (for example, a CD-ROM (Compact Disc-Read Only Memory), DVD (Digital Versatile Disk), etc.), a magneto-optical disk (for example, MD (Mini Disc)), or a semiconductor memory.

The CPU 1001 executes various kinds of processing in accordance with a program stored in the ROM 1002 or in accordance with a program read from the removable medium 1011 such as a magnetic disk, an optical disk, a magneto-optical disk, or a semiconductor memory into the storage unit 1008 and further into the RAM 1003. The RAM 1003 is also used to store data used by the CPU 1001 in the execution of various processes.

In the present description, the steps described in the program stored in the storage medium may be performed either in time sequence in accordance with the order described in the program or in a parallel or separate manner.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    text information receiving portion configured to receive text information;
    received text morphological analysis portion configured to perform morphological analysis on the text information;
    extraction portion configured to extract text information of a subtitle included in a program;
    subtitle text morphological analysis portion configured to perform morphological analysis on the text information of the subtitle;
    similarity calculation portion configured to calculate the similarity between a keyword included in a result of the received text morphological analysis performed by the received text morphological analysis portion and a keyword included in a result of the subtitle text morphological analysis performed by the subtitle text morphological analysis portion;
    comparison portion configured to compare the similarity with a predetermined threshold value;
    recording portion configured to record the program at a time at which the comparison portion determines, as a result of the comparison, that the subtitle text of the program currently includes a keyword having similarity higher than the predetermined threshold value;
    received text morphological analysis weighting portion configured to assign a weight to each keyword included in a result of the received text morphological analysis depending on (i) a number of occurrences of each keyword and (ii) whether each keyword is a noun or a word other than a noun, such that a respective received text keyword included in the result of the received text morphological analysis with a large number of occurrences will have a higher weight than a received text respective keyword with a small number of occurrences, and such that a respective received text keyword included in the result of the received text morphological analysis which is a noun will have a higher weight than a received text respective keyword which is a word other than a noun, and such that a respective received text keyword included in the result of the received text morphological analysis with a large number of occurrences and which is a noun will have a higher weight than a received text respective keyword with a small number of occurrences and which is a word other than a noun;
    subtitle text morphological analysis weighting portion configured to assign a weight to each keyword included in a result of the subtitle text morphological analysis depending on (i) a number of occurrences of each keyword and (ii) whether each keyword is a noun or a word other than a noun, such that a respective subtitle text keyword included in the result of the subtitle text morphological analysis with a large number of occurrences will have a higher weight than a respective subtitle text keyword with a small number of occurrences, and such that a respective subtitle text keyword included in the result of the subtitle text morphological analysis which is a noun will have a higher weight than a respective subtitle text keyword which is a word other than a noun, and such that a respective subtitle text keyword included in the result of the subtitle text morphological analysis with a large number of occurrences and which is a noun will have a higher weight than a respective subtitle text keyword with a small number of occurrences and which is a word other than a noun;

wherein the similarity calculation portion calculates the similarity between the keyword included in the result of the received text morphological analysis and the keyword included in the result of the subtitle text morphological analysis by using the weight assigned to each keyword included in the result of the received text morphological analysis and the weight assigned to each keyword included in the result of the subtitle text morphological analysis;

received text keyword managing portion configured to register, in a received text keyword table, the keyword included in the result of the received text morphological analysis and its assigned weight; and subtitle text keyword managing portion configured to register, in a subtitle text keyword table, the keyword included in the result of the subtitle text morphological analysis and its assigned weight;

wherein the similarity calculation portion calculates the similarity between the keyword included in the result of the received text morphological analysis and the keyword included in the result of the subtitle text morphological analysis by calculating a cosine of an angle between a vector of the received text keyword table and a vector of the subtitle text keyword table.

2. The information processing apparatus according to claim 1, wherein the text information receiving portion receives the text information via an electronic mail; and wherein the information processing apparatus further comprises registration portion configured to register, in a further table, the program recorded by the recording portion and information indicating the similarity in association with the electronic mail, when the recording portion records the program at a time at which the comparison portion determines, as a result of the comparison, that the subtitle text of the program currently includes a keyword having similarity higher than the predetermined threshold value.

3. The information processing apparatus according to claim 2, further comprising display portion configured to display information associated with one or more programs registered in the further table, in the order of decreasing similarity.

4. The information processing apparatus according to claim 3, further comprising:

selection portion configured to select information associated with a program registered in the further table from one or more pieces of information displayed by the display portion, and playback portion configured to play back the program selected by the selection portion.

5. The information processing apparatus according to claim 1, further comprising:

further similarity calculation portion configured to calculate the similarity between the keyword registered in the subtitle text keyword table and a keyword included in a result of received text morphological analysis performed on newly received text; and wherein the received text keyword managing portion, based on the calculated similarity, updates the subtitle text keyword table such that a keyword registered in the subtitle text keyword table having a higher similarity is located at a higher-order position and a keyword registered in the subtitle text keyword table having a lower similarity is located at a lower-order position.

6. An information processing method, comprising:

receiving text information;

performing morphological analysis on the text information;

extracting text information of a subtitle included in a program, performing morphological analysis on the text information of the subtitle;

calculating the similarity between a keyword included in a result of the received text morphological analysis performed in the received text morphological analysis step and a keyword included in a result of the subtitle text morphological analysis performed in the subtitle text morphological analysis step;

comparing the similarity with a predetermined threshold value;

recording the program at a time at which the comparison step determines, as a result of the comparison, that the subtitle text of the program currently includes a keyword having similarity higher than the predetermined threshold value;

assigning a weight to each keyword included in a result of the text morphological analysis depending on (i) a number of occurrences of each keyword and (ii) whether each keyword is a noun or a word other than a noun, such that a respective received text keyword included in the result of the received text morphological analysis with a large number of occurrences will have a higher weight than a received text respective keyword with a small number of occurrences, and such that a respective received text keyword included in the result of the received text morphological analysis which is a noun will have a higher weight than a received text respective keyword which is a word other than a noun, and such that a respective received text keyword included in the result of the received text morphological analysis with a large number of occurrences and which is a noun will have a higher weight than a received text respective keyword with a small number of occurrences and which is a word other than a noun;

assigning a weight to each keyword included in a result of the subtitle text morphological analysis depending on (i) a number of occurrences of each keyword and (ii) whether each keyword is a noun or a word other than a noun, such that a respective subtitle text keyword included in the result of the subtitle text morphological analysis with a large number of occurrences will have a higher weight than a respective subtitle text keyword with a small number of occurrences, and such that a respective subtitle text keyword included in the result of the subtitle text morphological analysis which is a noun will have a higher weight than a respective subtitle text keyword which is a word other than a noun, and such that a respective subtitle text keyword included in the result of the subtitle text morphological analysis with a large number of occurrences and which is a noun will have a higher weight than a respective subtitle text keyword with a small number of occurrences and which is a word other than a noun;

wherein the similarity calculating calculates the similarity between the keyword included in the result of the text morphological analysis and the keyword included in the result of the subtitle text morphological analysis by using the weight assigned to each keyword included in the result of the text morphological analysis and the weight assigned to each keyword included in the result of the subtitle text morphological analysis;

registering, in a received text keyword table, the keyword included in the result of the received text morphological analysis and its assigned weight; and registering, in a subtitle text keyword table, the keyword included in the result of the subtitle text morphological analysis and its assigned weight;

wherein the similarity calculation calculates the similarity between the keyword included in the result of the received text morphological analysis and the keyword included in the result of the subtitle text morphological analysis by calculating a cosine of an angle between a vector of the received text keyword table and a vector of the subtitle text keyword table.

7. The information processing method according to claim 6, further comprising:

calculating the similarity between the keyword registered in the subtitle text keyword table and a keyword included in a result of received text morphological analysis performed on newly received text; and updating, based on the calculated similarity, the subtitle text keyword table such that a keyword registered in the subtitle text keyword table having a higher similarity is located at a higher-order position and a keyword registered in the subtitle text keyword table having a lower similarity is located at a lower-order position.

8. A non-transitory computer readable storage medium having stored thereon a computer program executable by a computer to perform a process comprising:

receiving text information;

performing morphological analysis on the text information;

extracting text information of a subtitle included in a program;

performing morphological analysis on the text information of the subtitle;

calculating the similarity between a keyword included in a result of the received text morphological analysis performed in the received text morphological analysis step and a keyword included in a result of the subtitle text morphological analysis performed in the subtitle text morphological analysis step;

comparing the similarity with a predetermined threshold value;

recording the program at a time at which the comparison step determines, as a result of the comparison, that the subtitle text of the program currently includes a keyword having similarity higher than the predetermined threshold value;

assigning a weight to each keyword included in a result of the text morphological analysis depending on (i) a number of occurrences of each keyword and (ii) whether each keyword is a noun or a word other than a noun, such that a respective received text keyword included in the result of the received text morphological analysis with a large number of occurrences will have a higher weight than a received text respective keyword with a small number of occurrences, and such that a respective received text keyword included in the result of the received text morphological analysis which is a noun will have a higher weight than a received text respective keyword which is a word other than a noun, and such that a respective received text keyword included in the result of the received text morphological analysis with a large number of occurrences and which is a noun will have a higher weight than a received text respective keyword with a small number of occurrences and which is a word other than a noun;

assigning a weight to each keyword included in a result of the subtitle text morphological analysis depending on (i) a number of occurrences of each keyword and (ii) whether each keyword is a noun or a word other than a noun, such that a respective subtitle text keyword included in the result of the subtitle text morphological analysis with a large number of occurrences will have a higher weight than a respective subtitle text keyword with a small number of occurrences, and such that a respective subtitle text keyword included in the result of the subtitle text morphological analysis which is a noun will have a higher weight than a respective subtitle text keyword which is a word other than a noun, and such that a respective subtitle text keyword included in the result of the subtitle text morphological analysis with a large number of occurrences and which is a noun will have a higher weight than a respective subtitle text keyword with a small number of occurrences and which is a word other than a noun;

wherein the similarity calculating calculates the similarity between the keyword included in the result of the text morphological analysis and the keyword included in the result of the subtitle text morphological analysis by using the weight assigned to each keyword included in the result of the text morphological analysis and the weight assigned to each keyword included in the result of the subtitle text morphological analysis;

registering, in a received text keyword table, the keyword included in the result of the received text morphological analysis and its assigned weight; and registering, in a subtitle text keyword table, the keyword included in the result of the subtitle text morphological analysis and its assigned weight;

wherein the similarity calculation calculates the similarity between the keyword included in the result of the received text morphological analysis and the keyword included in the result of the subtitle text morphological analysis by calculating a cosine of an angle between a vector of the received text keyword table and a vector of the subtitle text keyword table.

9. The non-transitory computer readable storage medium according to claim 8, wherein the process further comprises:

calculating the similarity between the keyword registered in the subtitle text keyword table and a keyword included in a result of received text morphological analysis performed on newly received text; and updating, based on the calculated similarity, the subtitle text keyword table such that a keyword registered in the subtitle text keyword table having a higher similarity is located at a higher-order position and a keyword registered in the subtitle text keyword table having a lower similarity is located at a lower-order position.

10. An information processing apparatus, comprising:

a text information receiving unit adapted to receive text information;

a received text morphological analysis unit adapted to perform morphological analysis on the text information;

an extraction unit adapted to extract text information of a subtitle included in a program;

a subtitle text morphological analysis unit adapted to perform morphological analysis on the text information of the subtitle;

a similarity calculation unit adapted to calculate the similarity between a keyword included in a result of the received text morphological analysis performed by the received text morphological analysis unit and a keyword included in a result of the subtitle text morphological analysis performed by the subtitle text morphological analysis unit;

a comparison unit adapted to compare the similarity with a predetermined threshold value; and a recording unit adapted to record the program at a time at which the comparison unit determines, as a result of the comparison, that the subtitle text of the program currently includes a keyword having similarity higher than the predetermined threshold value;

a received text morphological analysis weighting unit adapted to assign a weight to each keyword included in a result of the received text morphological analysis depending on (i) a number of occurrences of each keyword and (ii) whether each keyword is a noun or a word other than a noun, such that a respective received text keyword included in the result of the received text morphological analysis with a large number of occurrences will have a higher weight than a received text respective keyword with a small number of occurrences, and such that a respective received text keyword included in the result of the received text morphological analysis which is a noun will have a higher weight than a received text respective keyword which is a word other than a noun, and such that a respective received text keyword included in the result of the received text morphological analysis with a large number of occurrences and which is a noun will have a higher weight than a received text respective keyword with a small number of occurrences and which is a word other than a noun;

a subtitle text morphological analysis weighting unit adapted to assign a weight to each keyword included in a result of the subtitle text morphological analysis depending on (i) a number of occurrences of each keyword and (ii) whether each keyword is a noun or a word other than a noun, such that a respective subtitle text keyword included in the result of the subtitle text morphological analysis with a large number of occurrences will have a higher weight than a respective subtitle text keyword with a small number of occurrences, and such that a respective subtitle text keyword included in the result of the subtitle text morphological analysis which is a noun will have a higher weight than a respective subtitle text keyword which is a word other than a noun, and such that a respective subtitle text keyword included in the result of the subtitle text morphological analysis with a large number of occurrences and which is a noun will have a higher weight than a respective subtitle text keyword with a small number of occurrences and which is a word other than a noun;

wherein the similarity calculation unit calculates the similarity between the keyword included in the result of the received text morphological analysis and the keyword included in the result of the subtitle text morphological analysis by using the weight assigned to each keyword included in the result of the received text morphological analysis and the weight assigned to each keyword included in the result of the subtitle text morphological analysis;

a received text keyword managing unit adapted to register, in a received text keyword table, the keyword included in the result of the received text morphological analysis and its assigned weight; and a subtitle text keyword managing unit adapted to register, in a subtitle text keyword table, the keyword included in the result of the subtitle text morphological analysis and its assigned weight;

wherein the similarity calculation unit calculates the similarity between the keyword included in the result of the received text morphological analysis and the keyword included in the result of the subtitle text morphological analysis by calculating a cosine of an angle between a vector of the received text keyword table and a vector of the subtitle text keyword table.

11. The information processing apparatus according to claim 10, further comprising:

a further similarity calculation unit adapted to calculate the similarity between the keyword registered in the subtitle text keyword table and a keyword included in a result of received text morphological analysis performed on newly received text; and wherein the received text keyword managing unit, based on the calculated similarity, updates the subtitle text keyword table such that a keyword registered in the subtitle text keyword table having a higher similarity is located at a higher-order position and a keyword registered in the subtitle text keyword table having a lower similarity is located at a lower-order position.

* * * * *